United States Patent [19]

Johnson et al.

[11] Patent Number: 4,529,348

[45] Date of Patent: Jul. 16, 1985

[54] SPOUT AIMER

[75] Inventors: Stanley J. Johnson, Cedar Falls; Gary L. Gold, Waterloo, both of Iowa

[73] Assignee: Deere & Company, Moline, Ill.

[21] Appl. No.: 482,691

[22] Filed: Apr. 6, 1983

[51] Int. Cl.³ .............................................. B65G 67/22
[52] U.S. Cl. ..................................... 414/335; 406/28; 406/165
[58] Field of Search ............... 414/335, 133, 293, 294, 414/301, 302, 323, 345; 406/28, 165, 30; 239/659, 688; 198/631; 193/22, 23

[56] References Cited

U.S. PATENT DOCUMENTS

| | | | |
|---|---|---|---|
| 3,166,204 | 1/1965 | De Buhr | 414/335 |
| 3,786,945 | 1/1974 | Symonds | 414/335 |
| 3,791,536 | 2/1974 | Moeller | 414/282 |
| 4,042,132 | 8/1977 | Bohman et al. | 414/335 |
| 4,172,518 | 10/1979 | Grayson | 198/865 X |
| 4,376,609 | 3/1983 | Bohman et al. | 414/335 |
| 4,401,403 | 8/1983 | Johnson et al. | 414/335 |
| 4,441,846 | 4/1984 | Johnson | 414/335 |

FOREIGN PATENT DOCUMENTS 2073914 10/1981 United Kingdom ................. 414/335

OTHER PUBLICATIONS

E. C. Lundahl, Invention Disclosure, Jan. 1, 1981 and May 15, 1981, pp. 32, 122, 224, 229 and unnumbered.

Primary Examiner—Robert J. Spar
Assistant Examiner—Stuart J. Millman

[57] ABSTRACT

A spout control system permits automatic and manual control of a forage harvester spout which directs crop to a receiving wagon. Under certain conditions, the control system automatically sweeps the spout in a stepwise manner through a series of positions to achieve uniform wagon filling. This and other functions are achieved with the use of a suitably programmed microprocessor.

25 Claims, 23 Drawing Figures

SPOUT AIMER

BACKGROUND OF THE INVENTION

This invention relates to a control system for controlling the position of a crop discharge spout on an agricultural machine (such as a forage harvester) with relation to a crop-receiving wagon.

It is known to automatically align the crop discharge spout of a forage harvester with respect to the tongue of a trailing crop-receiving wagon to reduce crop spillage. Such systems are described in U.S. Pat. No. 3,786,945 and in U.S. Pat. No. 4,042,132. Another such system, utilizing electro-optical devices, is described in British patent application GBT No. 2073914, published Oct. 21, 1981. However, the operation of such optical devices could be adversely affected by the large amount of dirt and debris usually present in the vicinity of a forage harvesting machine. The system described in the published British application includes an offset device which is comprised of an adjustable potentiometer. It is suggested therein that this potentiometer can be manually adjusted to achieve better side-to-side distribution of material in the collector vehicle. However, a system which would *automatically* provide even wagon filling has long been desired. This published British application recognizes this fact and suggests that "an automatic readjustment may be applied to produce a periodically altering position programmed in a specific manner", and further suggests that ". . . it may be desired slowly to dither or oscillate the discharge spout to achieve a better side-to-side distribution . . .". However, this British publication does not disclose any means by which such desired automatic functions could be achieved.

It has been suggested that even wagon filling can be obtained by continuously sweeping the spout back and forth in an oscillatory manner. However, such continuous sweeping requires large amounts of energy and would increase the rate of wear of the mechanical or hydraulic components.

It is also known to maintain the spout within distinct wide and narrow ranges, depending upon whether the forage harvester is traveling straight or is executing a turn, as shown in U.S. patent application, Ser. No. 282,364, filed July 13, 1981 now U.S. Pat. No. 4,401,403 and in U.S. patent application Ser. No. 347,125, filed Feb. 9, 1982, now U.S. Pat. No. 4,441,846 both assigned to the assignee of the present invention. All these aforementioned systems utilize analog and discrete component circuitry and thus, their functional complexity is limited by cost considerations. Furthermore, although these systems help to prevent crop spillage, they do not provide automatic even wagon filling because, while in straight line travel, the spout may spend a majority of the time directing crop to one side or the other of the wagon. Therefore, it is desirable to make use of advanced electronics technology to overcome this problem and to implement other desired spout-aiming control functions.

SUMMARY OF THE INVENTION

An object of the present invention is to provide a forage harvester spout control system which automatically sweeps the spout during certain conditions to uniformly fill a crop-receiving wagon.

Another object of the present invention is to prevent automatic spout sweeping when the forage haresster is executing a turn.

Another object of the present invention is to provide a spout-aiming controller which can be easily adjusted for crop-receiving vehicles of different sizes.

Another object of the present invention is to prevent automatic spout sweeping when the spout is manually positioned off of the wagon center to compensate for wind or side-hill operation.

A further object of the present invention is to provide a spout aimer which automatically returns the spout to an edge of a wagon crop-receiving range of positions (window) when the operator manually moves the spout outside of this range.

An additional object of the present invention is to provide a spout-aiming system with various self-diagnostic capabilities.

These and other objects are achieved by the present invention which includes sensors for sensing spout and wagon position. A wagon width potentiometer allows the control system to be adjusted for different sized crop-receiving wagons. A programmed microprocessor periodically samples input signals from these devices and generates spout control command signals as a function thereof. The spout is aimed so as to be precisely aligned with the center of the wagon opening when the forage harvester and wagon are in a turn. A few seconds after the vehicles have returned to straight line travel, the spout is permitted to move within a wider range of positions. A turn delay timer function holds the spout within the narrow range for 15 seconds after termination of a turn to aid in spout centering when completing gradual turns. When a manual spout movement is made, the turn delay timer is cleared so that the spout may be immediately maneuvered within the wide range. This permits the operator to manually position the spout to a side of the wagon opening to compensate for wind or side-hill operation.

When the operator points the spout outside the opening, the controller will automatically return the spout to the edge of the wagon opening upon completion of the manual movement.

When the wagon is in line with the forage harvester, the 15 second turn delay time period is expired and the spout is aimed at the central 25% of the wagon opening, then the controller will autmomatically enter a sweep mode. In the sweep mode, the spout is moved stepwise through a sequence of 5 positions across the wagon opening to evenly fill the wagon. The consecutive positions are on alternate sides of the wagon center and the spout remains at each position for a predetermined time, such as 15 seconds. A sweep mode software counter is incremented every time an automatic spout movement is made so that the spout will normally move to a different one of the five positions each time the sweep mode operation is begun. Manual movement of the spout disables the sweep mode until the spout is automatically or manually returned to the central 25% of the window and the other sweep mode conditions are satisfied.

If the wagon is moved beyond plus or minus 55 degrees from the in-line position, the spout is stopped at the angle corresponding to an angle of plus or minus 55 degrees. This prevents excessive spout rotation when the wagon tongue is in the stowed position or is moving freely.

If the spout has been rotated under manual control to a position beyond the range of the spout position sensor, the microprocessor detects a wrap-around condition. When this occurs, the automatic spout aimer will rotate the spout back through the "end of range" on the sensor and return the spout to the normal position. This feature will work for excessive manual rotation in either direction.

Hydraulic valve shut-off time and inertia in the hydraulic motor, spout, etc. cause the spout to continue moving for a few degrees after valve electric power has been shut off. The automatic spout aimer compensates for this by shutting the valve off early and coasting the spout into the target position.

If the wagon tongue sensor fails or is rotated to the "end of range" area of the potentiometer, a pair of electronic module "tongue" lights will come on and the automatic spout aimer will cease operating. Similarly, if the spout sensor fails or the spout is rotated to the sensor "end of range" area, a pair of "spout" lights will come on and the automatic spout aimer will try to move the spout out of the "end of range" area. After four seconds, it will stop operating if the pot does not come out of the "end of range" area. If the input multiplexer or output relays in the electronic module fail, the "tongue" and "spout" lights will alternately flash, indicating an electronic module failure.

A noisy or erratic spout sensor producing intermittent voltages will not confuse the automatic spout aimer. The first derivative is taken on the sensor input data and the information is discarded if the rate of change exceeds the normal maximum.

DETAILED DESCRIPTION

Figure 1:
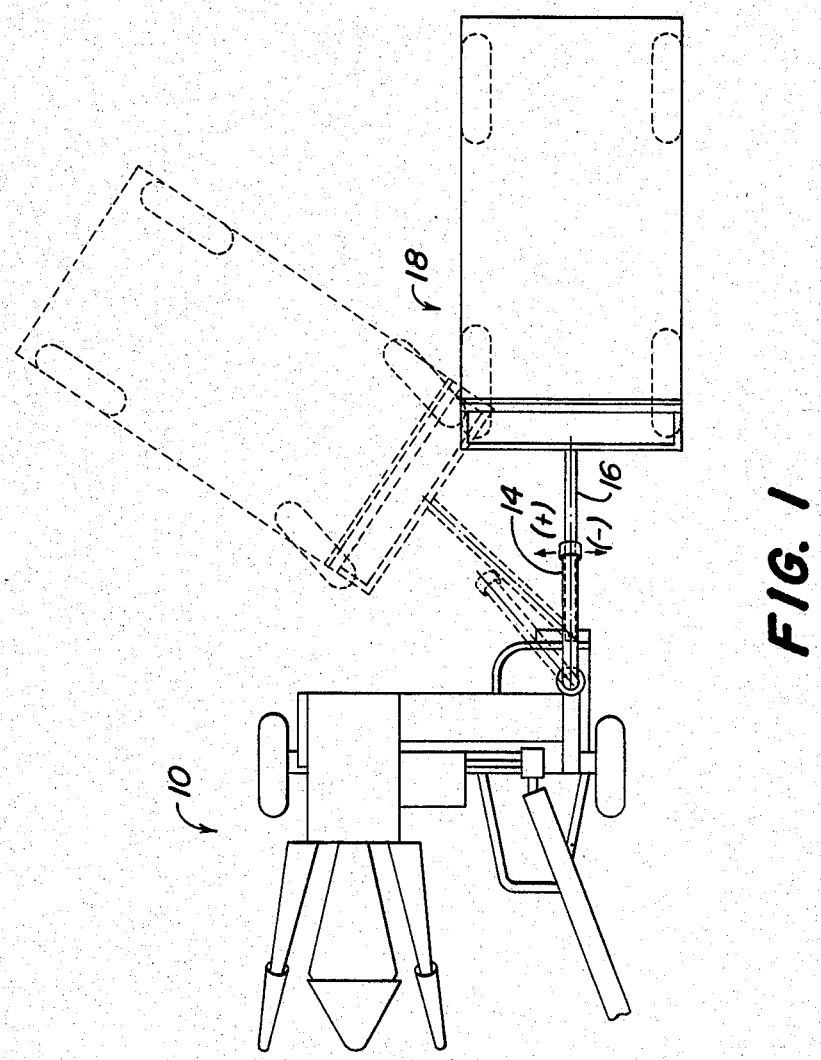
FIG. 1 is an illustration depicting a typical agricultural machine, such as a forage harvester, pulling a crop-receiving wagon.

As seen in FIG. 1, a tractor-drawn forage harvester 10, or a self-propelled forage harvester (not shown), includes a conventional drawbar which is hidden from view by a rotatable forage dispensing spout 14. The tongue 16 of a wagon 18 is hitched to the drawbar so that the wagon 18 receives the material discharged from the spout 14. A spout angle is defined as the relative angle between the spout 14 and the fore-and-aft axis of the harvester 10. A tongue angle is defined as the relative angle between the wagon tongue 16 and the fore-and-aft axis.

Figure 2:
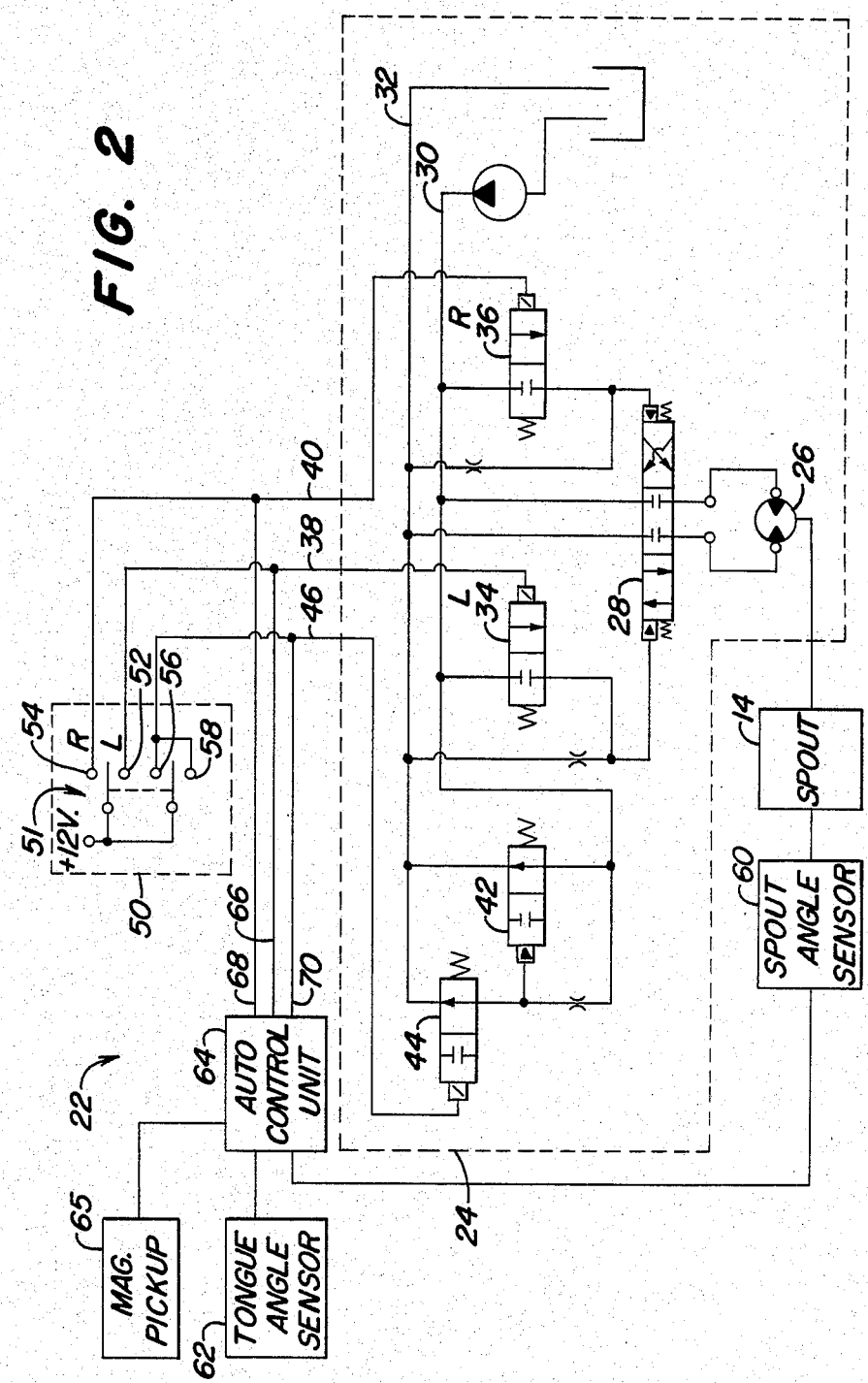
FIG. 2 is a simplified schematic representation of the control system of the applicants' spout aiming control system.

A control system 22, schematically shown in FIG. 2, controls the position of the spout 14, either automatically or manually, via a known electrohydraulic circuit 24, which is currently used in production forage harvesters to move the spout 14 left or right. Circuit 24 includes a conventional bi-directional fluid motor 26 for rotating the spout 14 either left or right, viewing FIG. 1, in response to fluid received from pilot-operated directional control valve 28, connected to a pump-fed pressure line 30 and a tank line 32. Left and right solenoid-operated pilot valves 34 and 36 operate the directional control valve 28 in response to control signals applied to left and right control lines 38 and 40, respectively. For operating with an open-center hydraulic system, (not shown), circuit 24 includes an optional pilot-operated bypass valve 42 controlled by solenoid-operated valve 44 which receives control signals via control line 46. It should be noted that it is within the scope of this invention to substitute an electric powered motor for the hydraulic motor 26 and an electric control circuit for the hydraulic circuit 24.

A manual directional control switch module 50 includes a double pole, double throw momentary-type switch 51 with one side of both poles connected to the +12 volt terminal of the vehicle battery or power supply. Left and right switch contacts 52 and 54 are connected to left and right input or control lines 38 and 40, respectively. Optional open center contacts 56 and 58 are both connected to control line 46 so that valve 44 is actuated to close bypass valve 42 whenever switch 51 is in contact with contacts 52 or 54.

Figure 3:
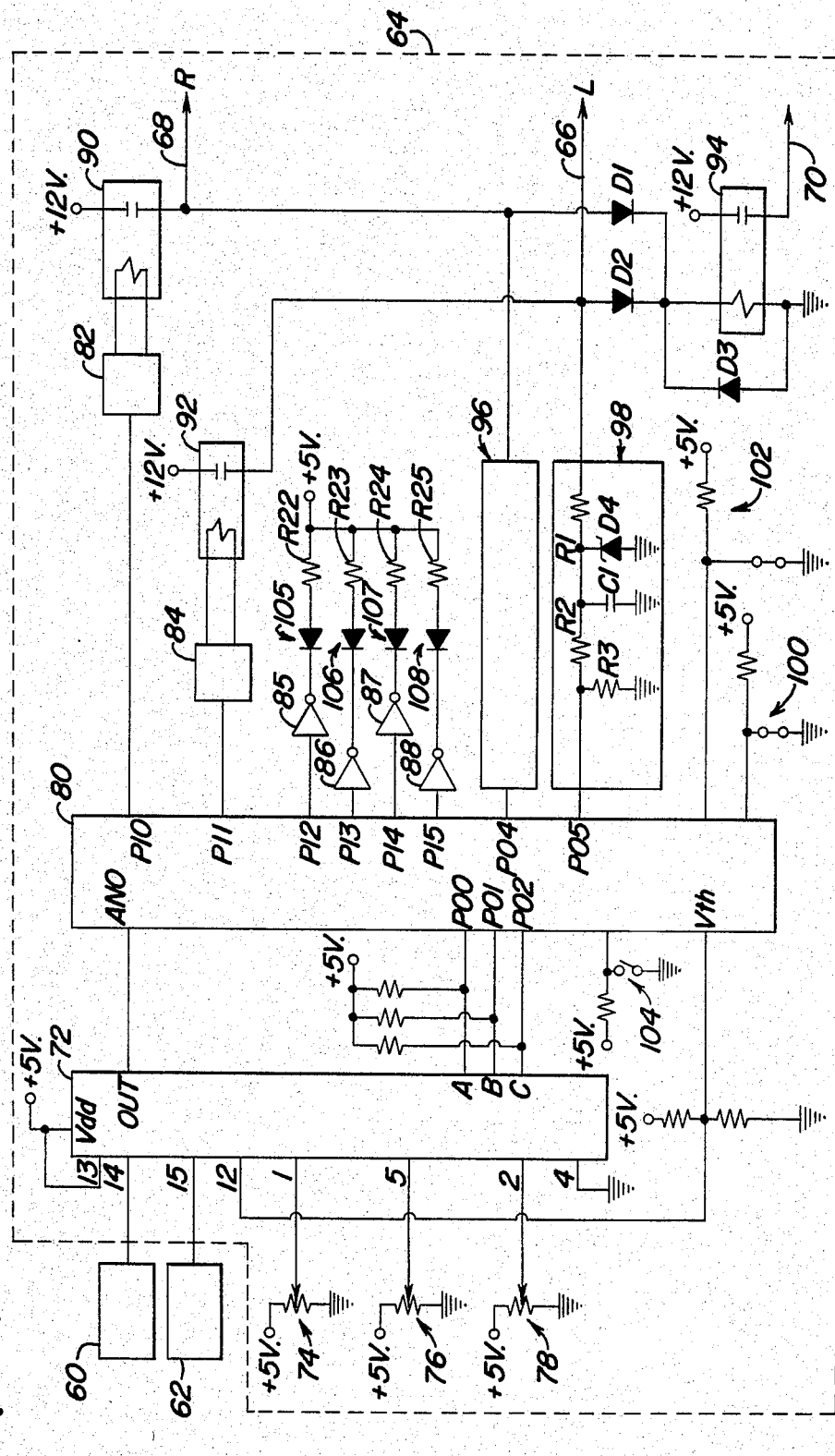
FIG. 3 is a detailed circuit schematic of the auto control unit of FIG. 2.
Figure 4A:
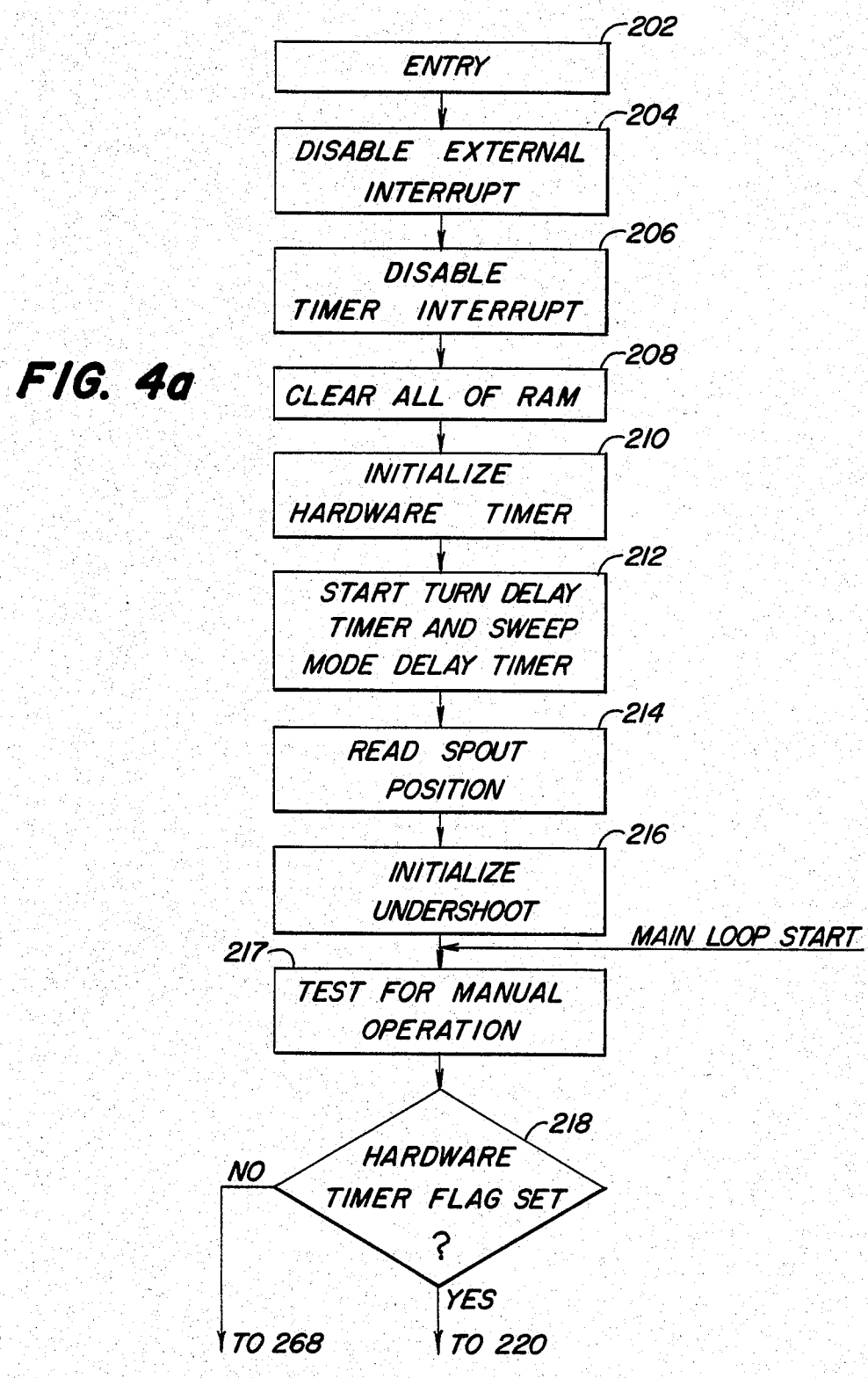
FIGS. 4a–4p are logic flow diagrams of the control algorithm executed by the microprocessor of FIG. 3.
Figure 4B:
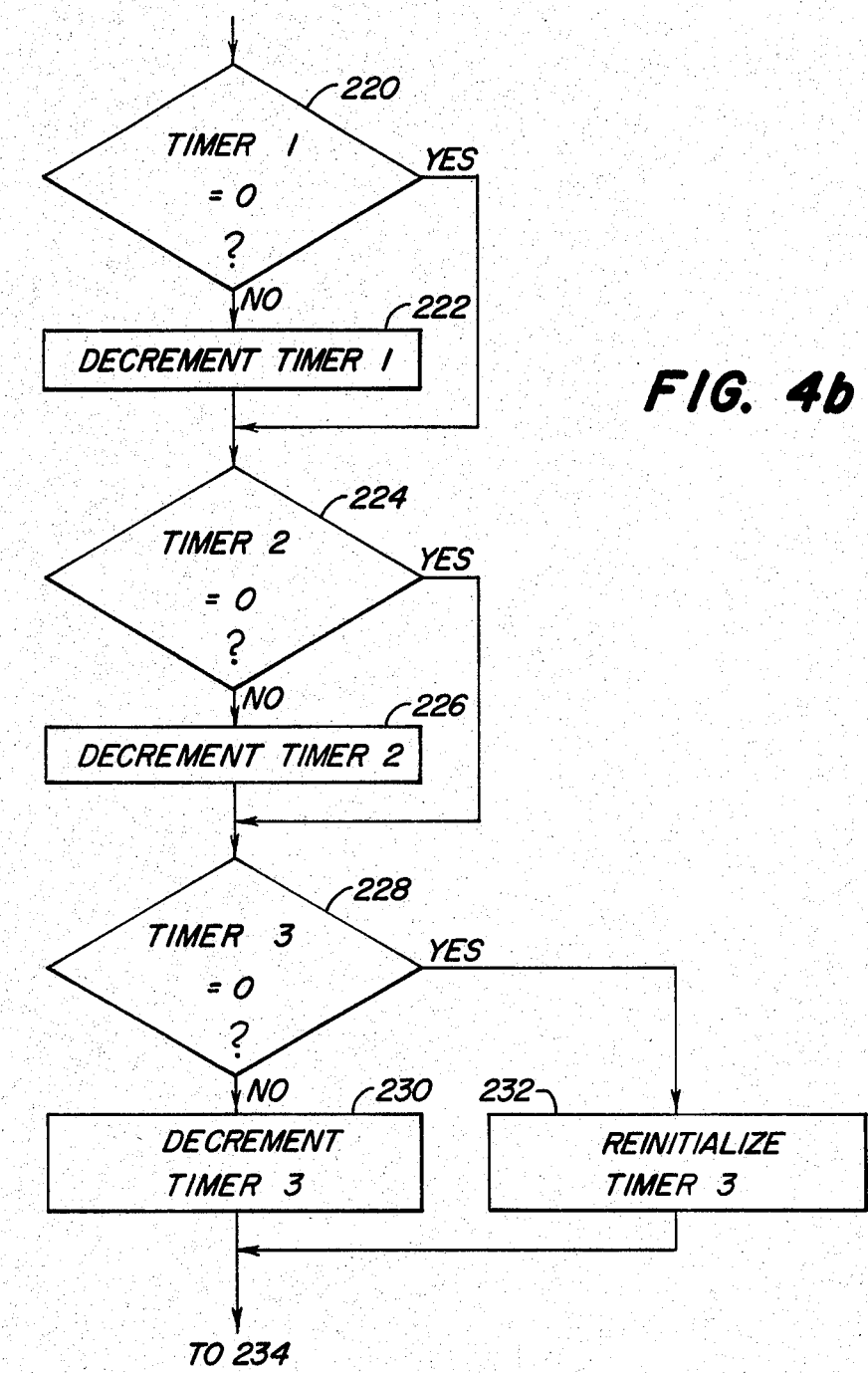
Figure 4C:
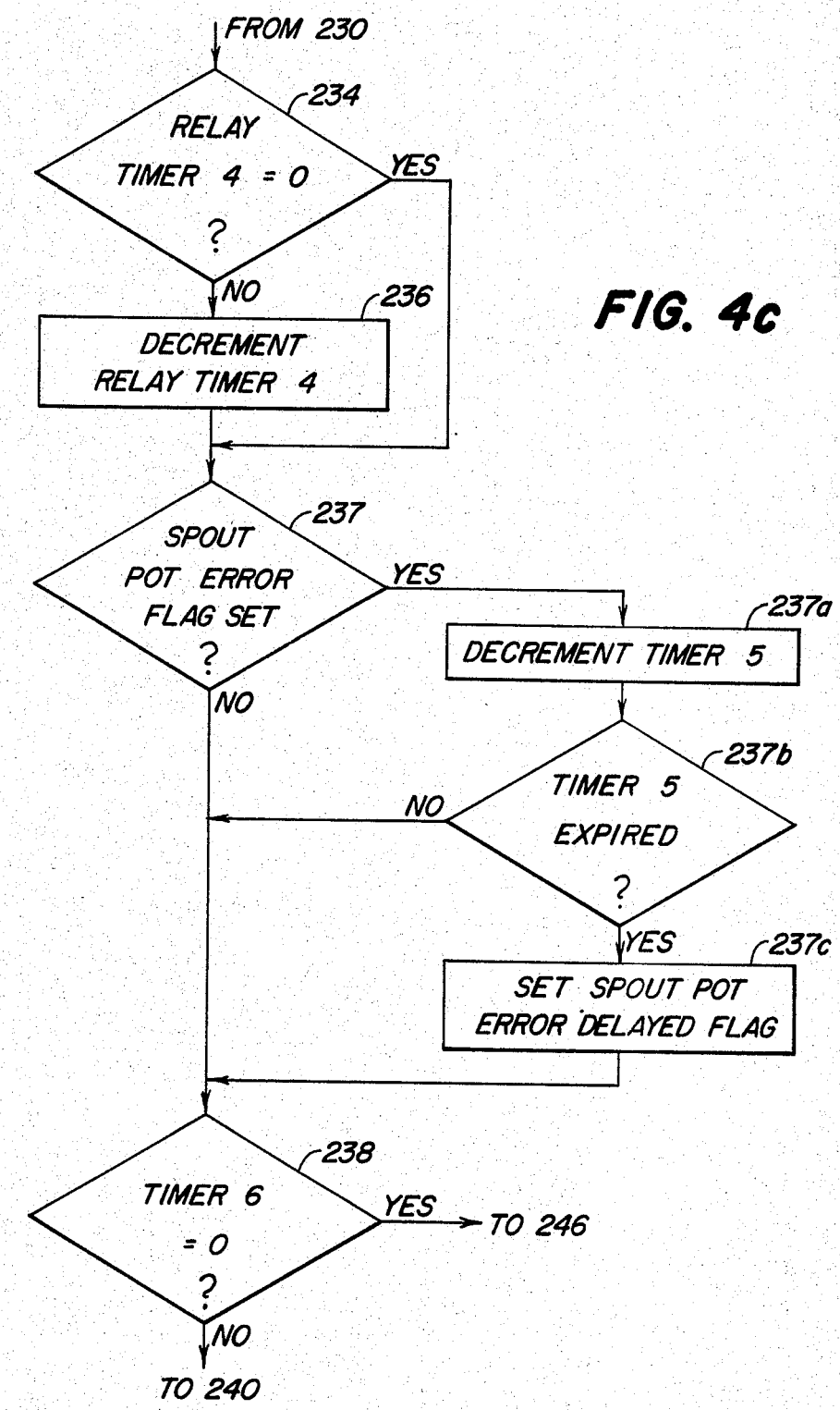
Figure 4D:
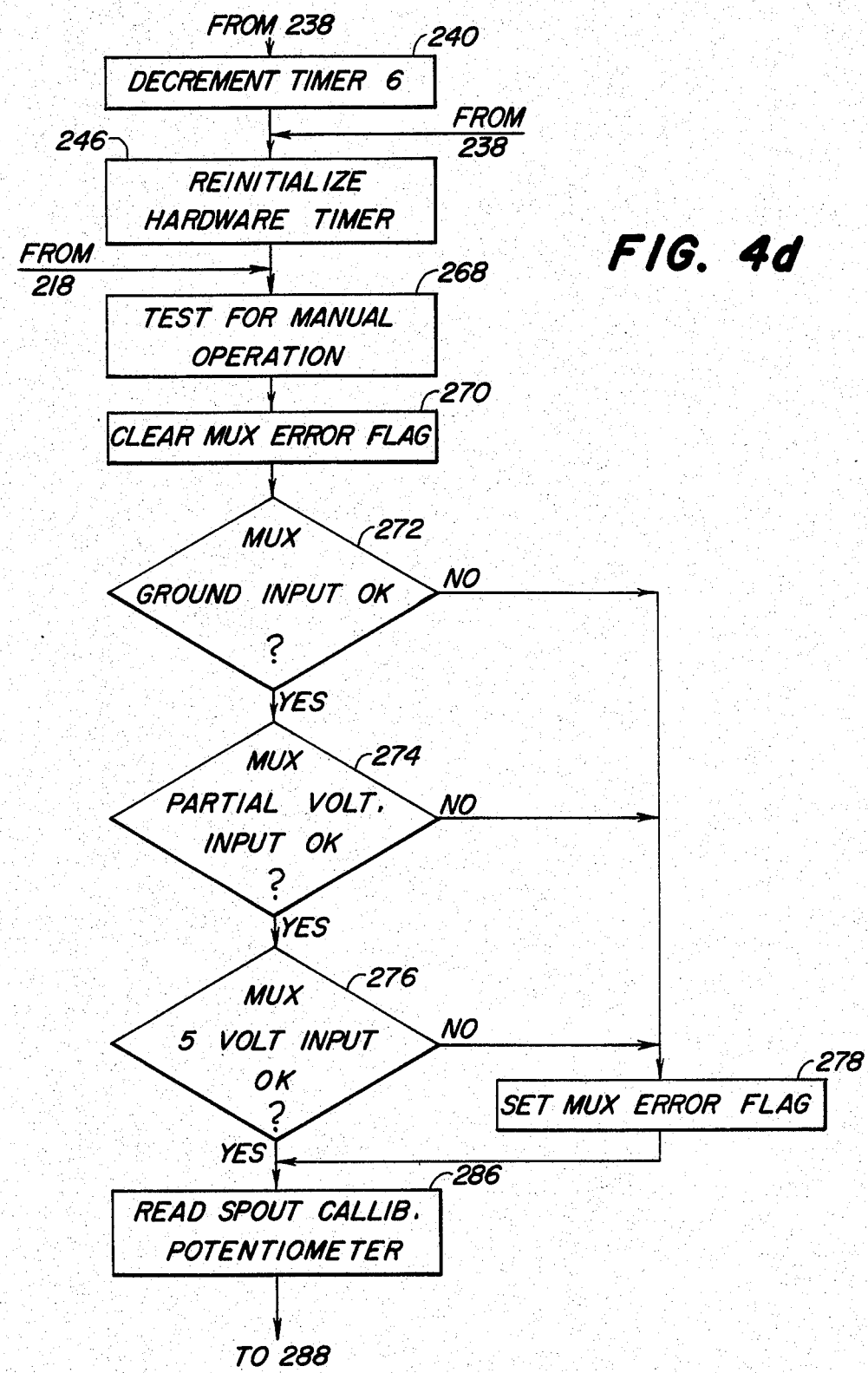
Figure 4E:
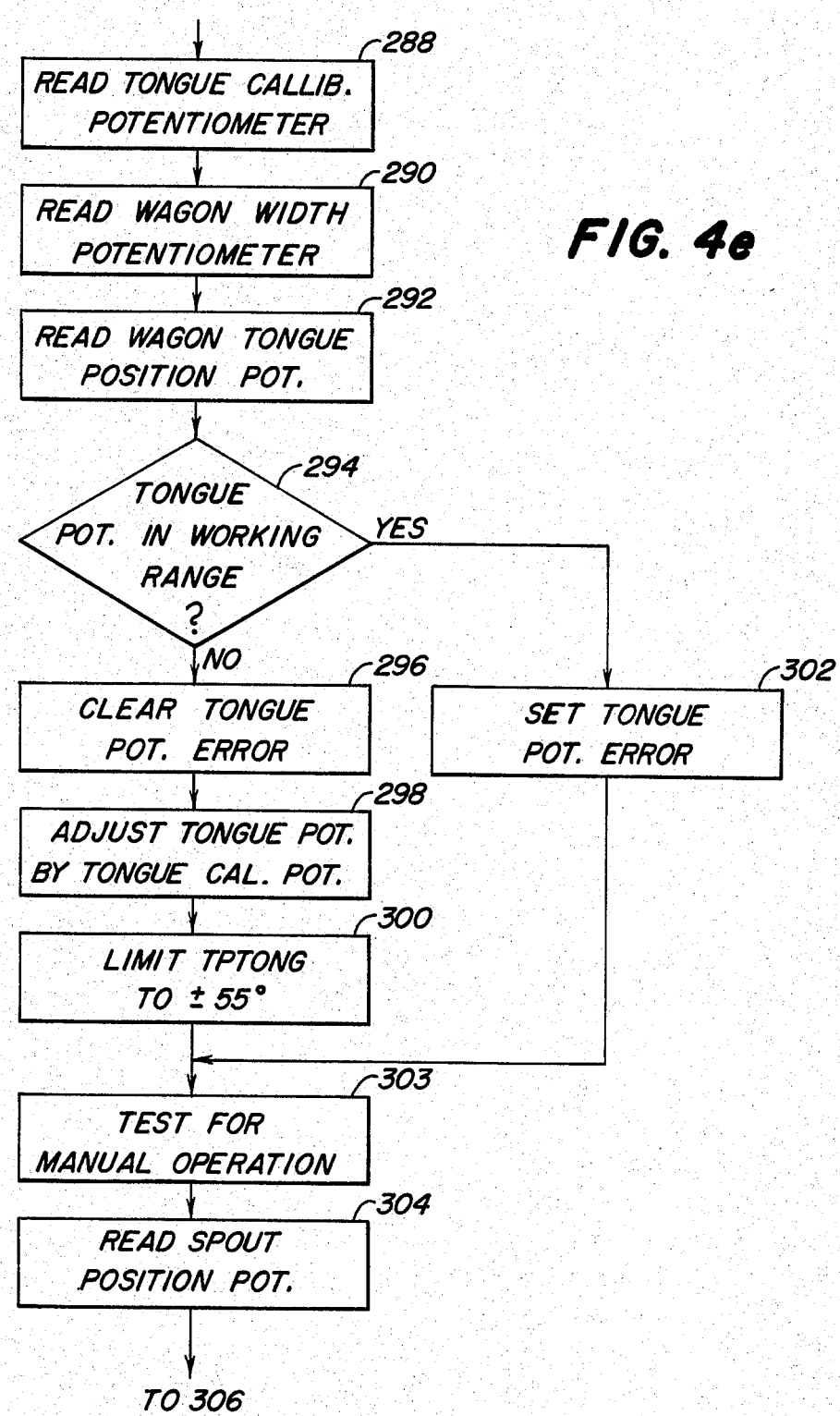
Figure 4F:
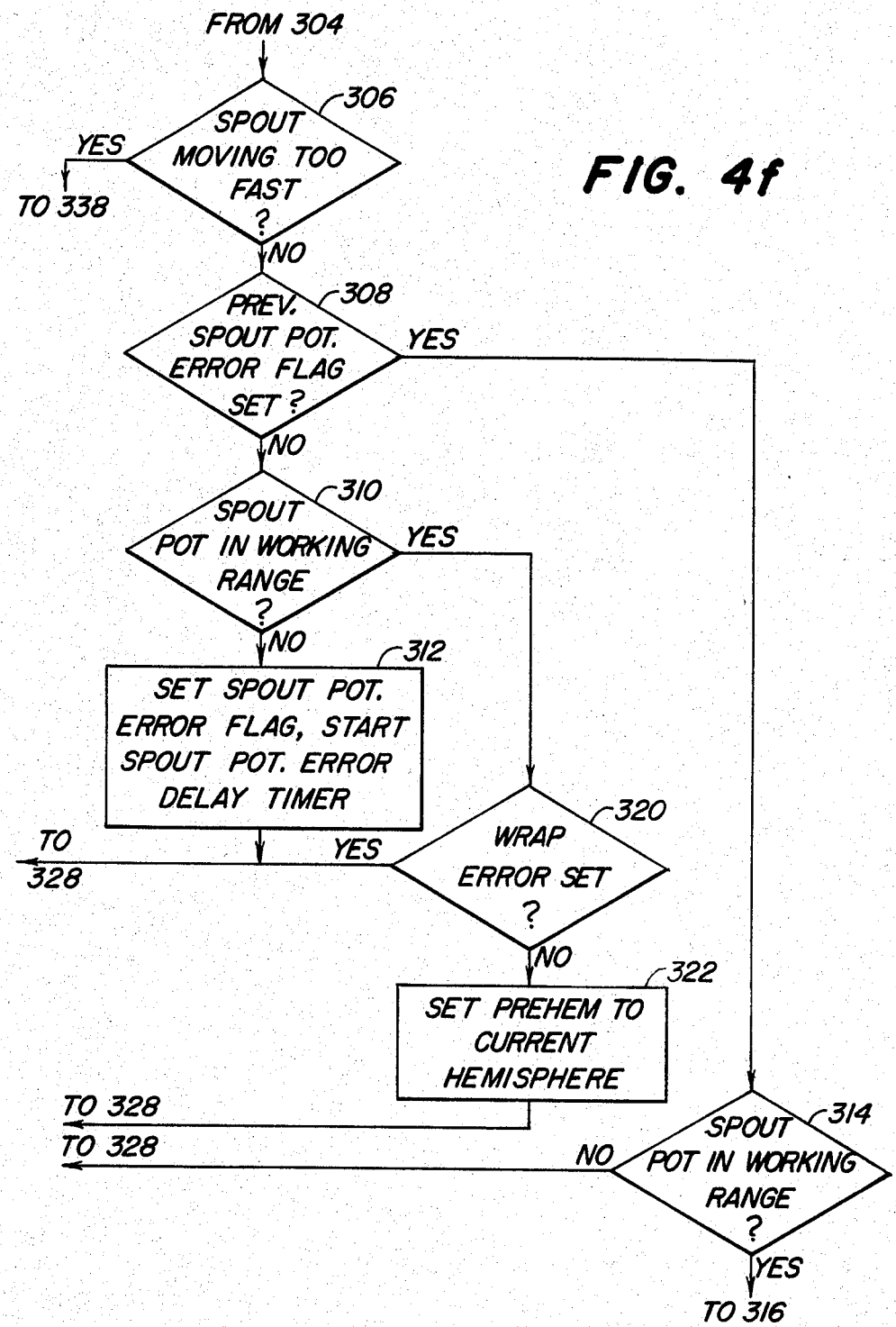
Figure 4G:
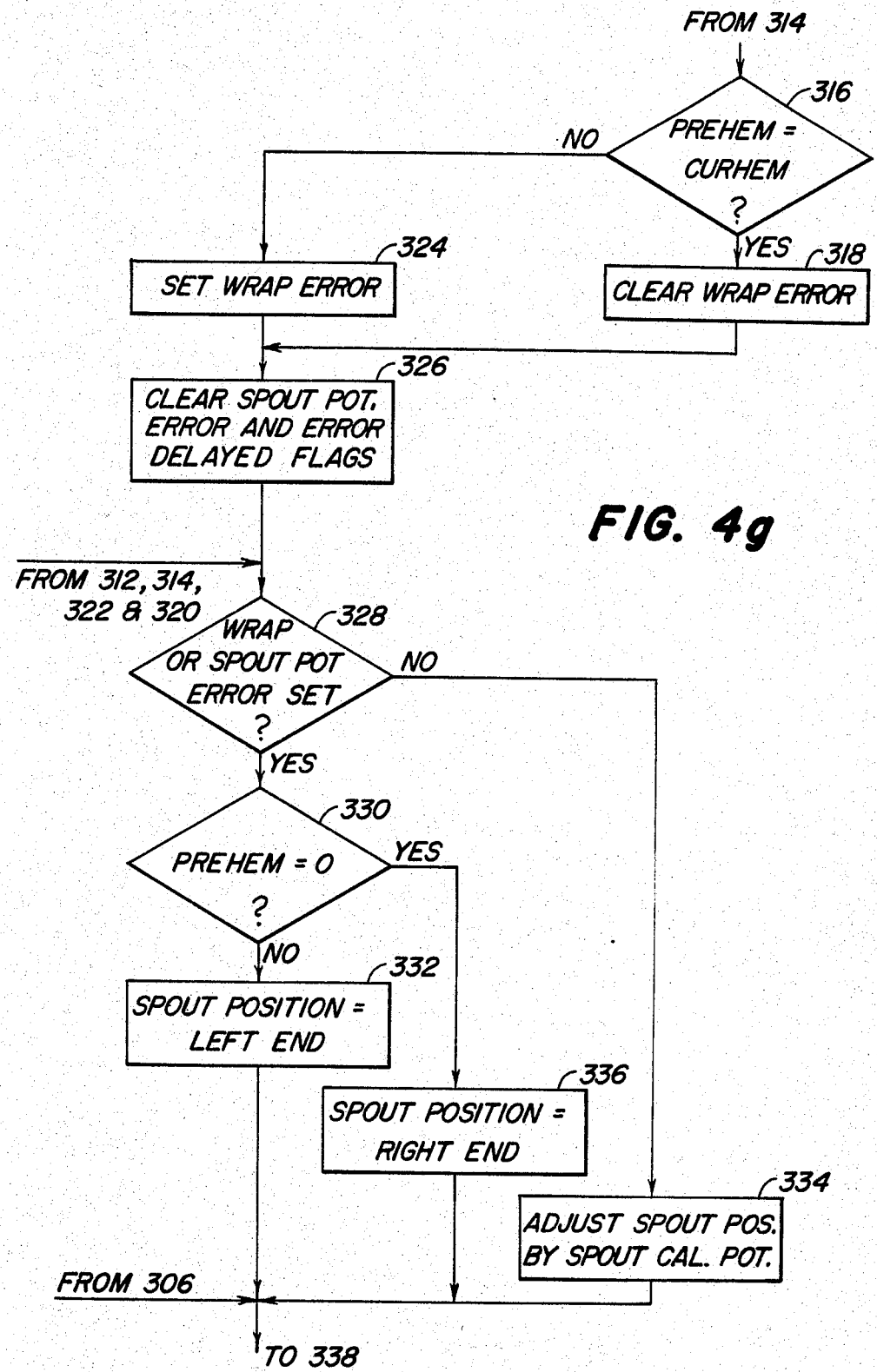
Figure 4H:
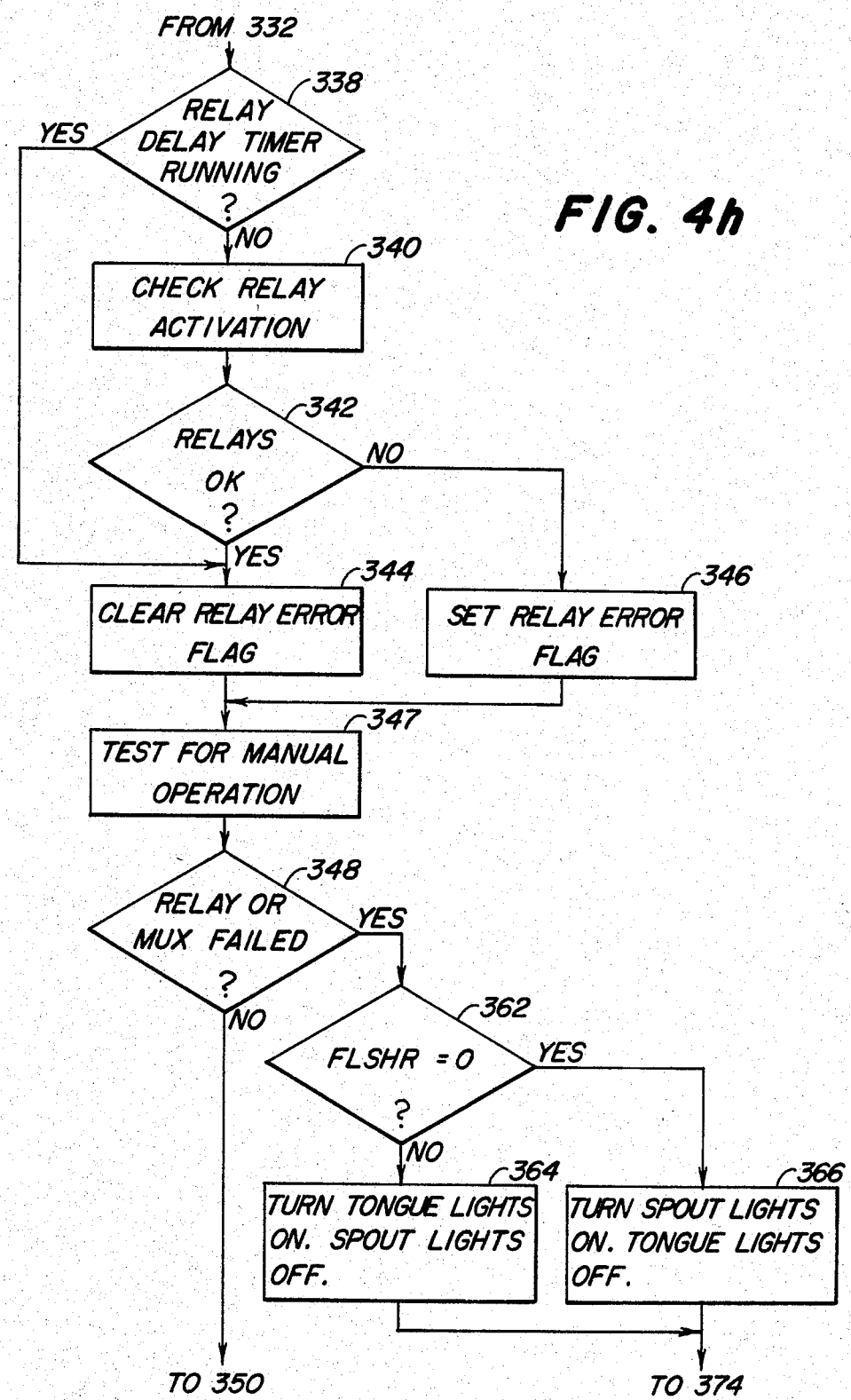
Figure 4I:
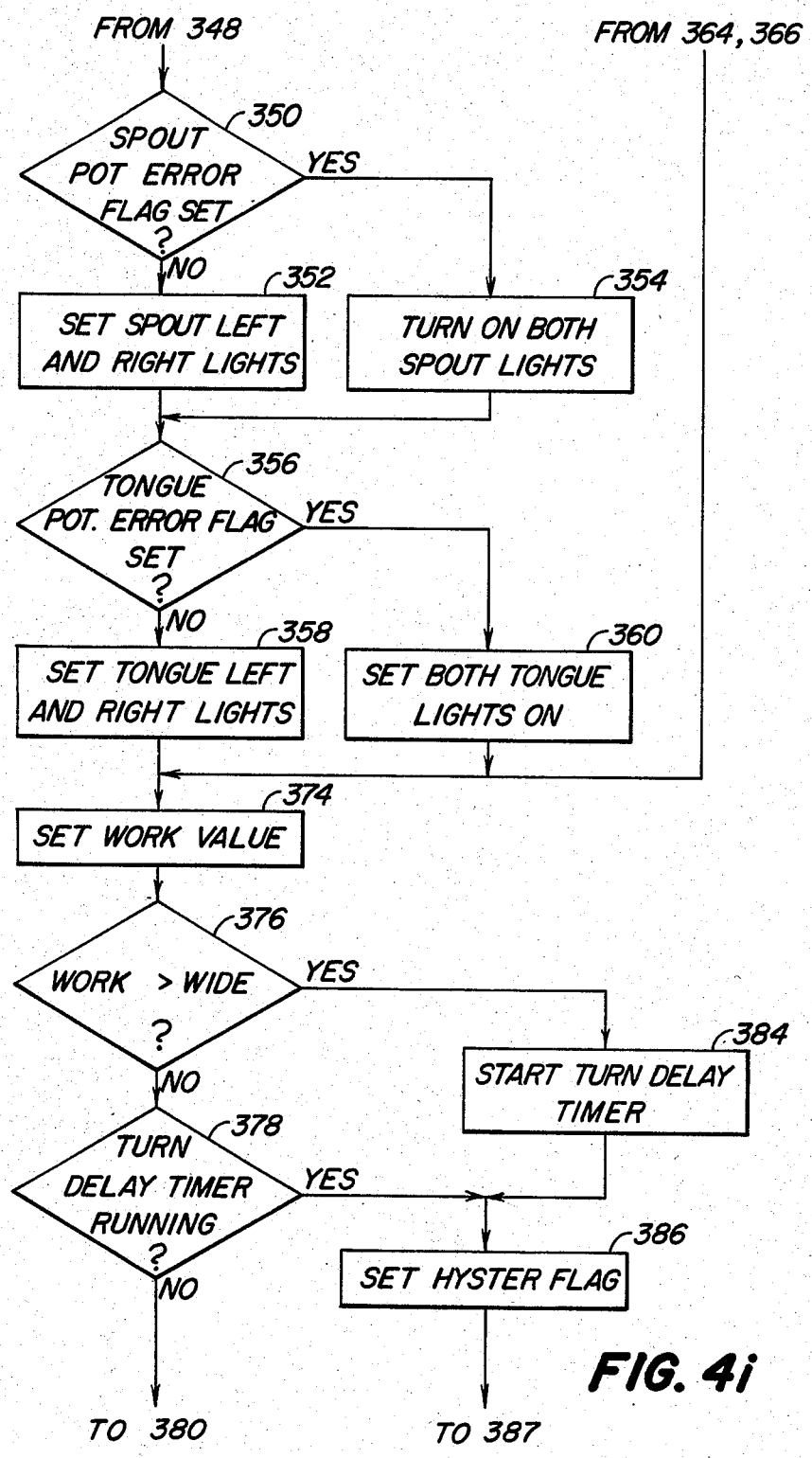
Figure 4J:
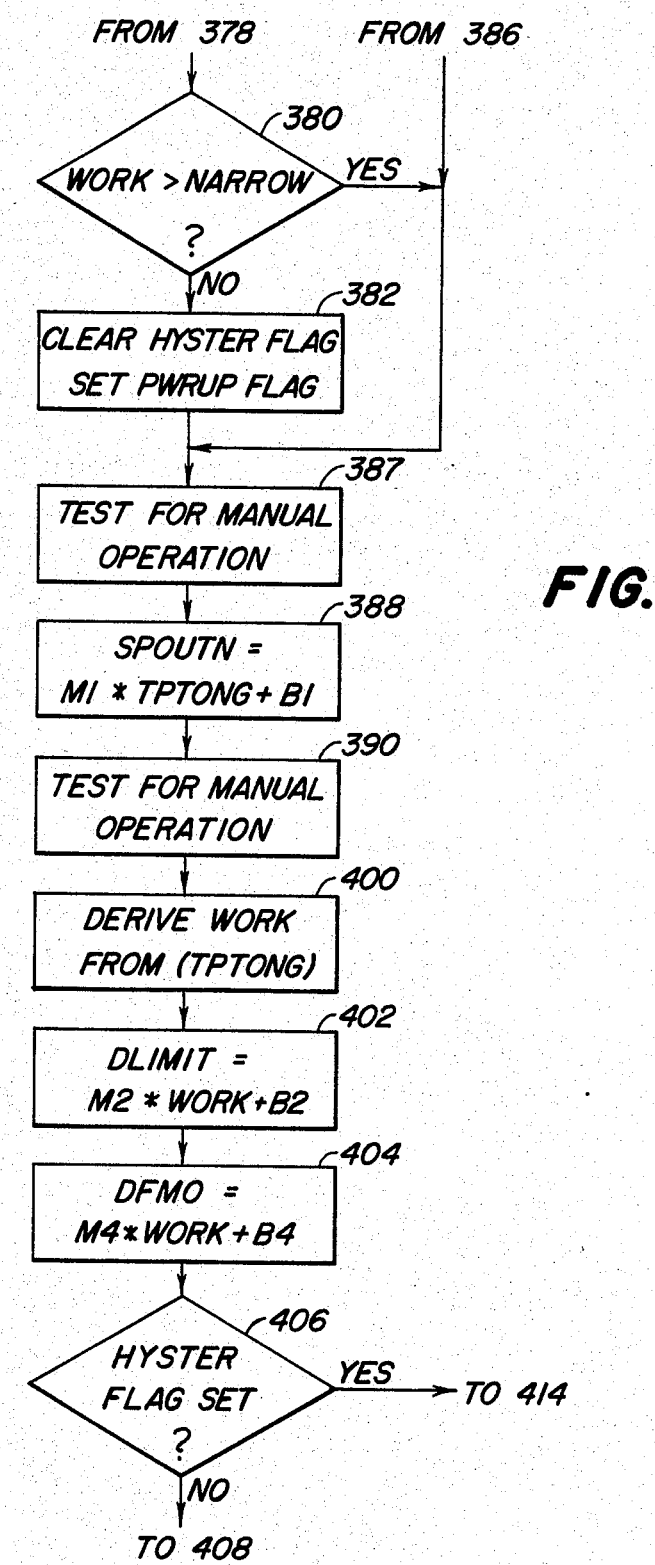
Figure 4K:
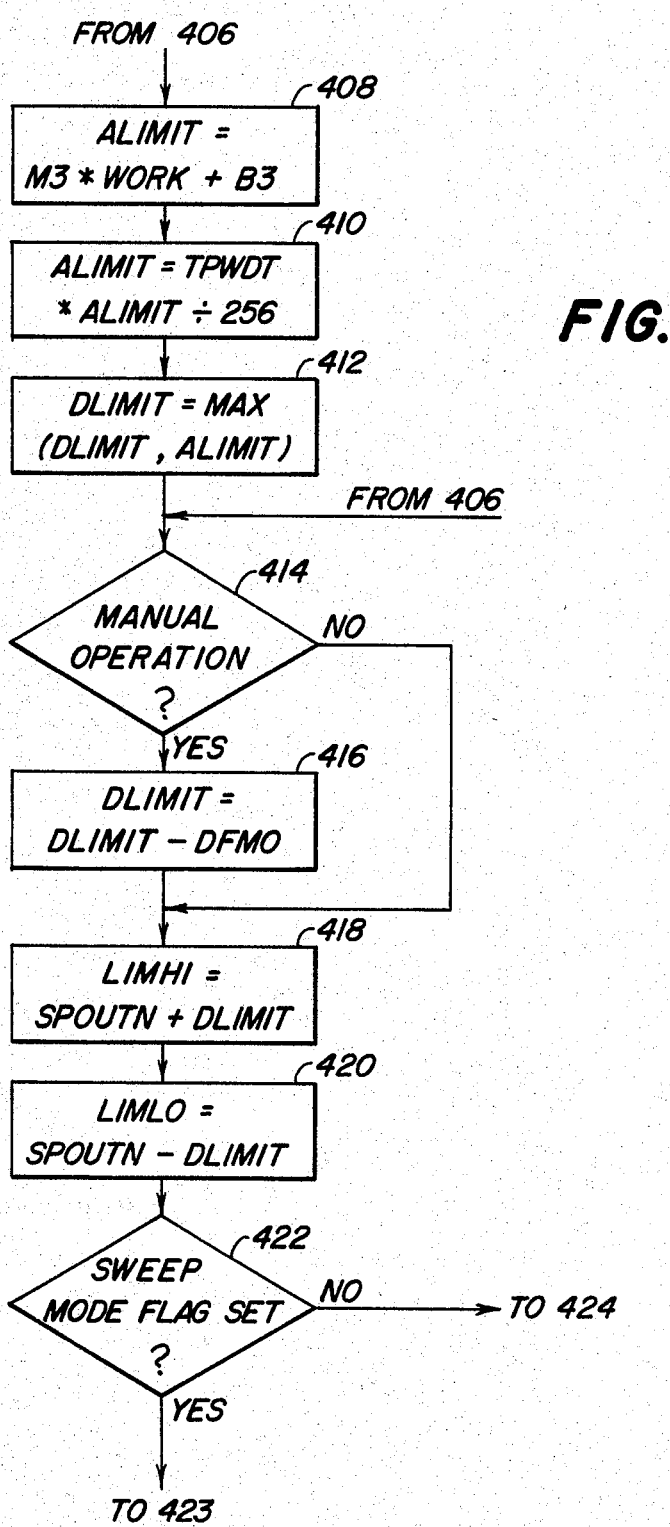

Referring now to FIG. 3, the spout angle sensor 60 and the tongue angle sensor 62, both preferably consist of conventional rotary potentiometers (pots) connected to generate voltages indicative of the spout angle and the tongue angle, respectively. In the case of a non-towed, crop-receiving wagon, a wagon position signal could be obtained by the use of an optical wagon position sensing system, such as described in the aforesaid published British Application, No. 2,073,914. The spout angle voltage generated by spout angle sensor 60 may be considered to be the feedback signal for the automatic control circuit 64. The automatic control circuit 64 generates left and right control signals in output lines 66 and 68 and in output line 70, as a function of the position of the tongue and of the spout. Output lines 66, 68 and 70 are connected to control lines 38, 40 and 46, respectively. Spout and tongue angle sensors 60 and 62 are connected to inputs of a conventional multiplexer 72. Potentiometers 74, 76 and 78 are also coupled to input pins 1, 5 and 2 of the multiplexer 72 and provide adjustable calibration signals that will be explained later.

The spout and tongue pots preferably have zero to full-scale resistance ranges which span over 340 degrees and with deadband ranges of 20 degrees. The resistance ranges are positioned so that one-half of the full scale resistance corresponds to a straight-back spout or tongue position. Furthermore, for diagnostic purposes, a pair of points within the full scale resistance ranges, one being approximately 5 degrees from the zero resistance point, the other being approximately 1 degree from the full scale resistance point, are used to define the boundaries of "electrical" or "working" ranges of the potentiometer.

The spout potentiometer 60 is preferably gear-coupled to the spout so that a spout position angular range of approximately 143 degrees corresponds to the pot full scale resistance range or "working range" of 334 degrees. Thus, the "working" range for the spout pot 60 corresponds to a range of spout positions of approximately 140 degrees. The tongue pot, 62, however, is directly couple to the tongue 16 so that there is a 1:1 relationship between the tongue angle range and the angle range of the tongue pot 62. The relationship of the signals from the potentiometers 60 and 62 to values corresponding to this "electrical" range is examined to determine whether potentiometer error flags, or a spout wrap-around error flag, should be generated. This is further described later herein with reference to steps 294, 302 and 304–336 of a microprocessor program, for example.

Pull-up and pull-down biasing resistors (not shown) are connected to the wipers of potentiometers 74, 76 and 78. For spout and tongue calibration potentiometers 74, 76, these biasing resistors are chosen so that in the event of an open circuit condition in the wiper lead, the voltages received by the multiplexer 72 will correspond to a centered calibration adjustment. For the wagon width potentiometer 78, the biasing resistors are chosen so that the wiper open circuit voltage will correspond to the normal width of a typical wagon.

The multiplexer 72 feeds selected signals to the analog input AN0 of a microprocessor (micro) 80. The micro 80 includes a central processing unit, ROM program memory, a RAM data memory and input and output ports. In general, the microprocessor ROM stores instructions, which comprise the coded information that controls the activities of the central processing unit. The microprocessor RAM stores the coded data information processed by the central processor unit. The central processor unit reads each instruction from the program memory according to a predetermined sequence in order to control its data processing activities. The microprocessor program, which will be described later, is represented by the flow charts of FIG. 4a–4p, 5, 7 and 8.

The control signals generated by the microprocessor 80 are applied to the address inputs (not shown) of the multiplexer 72, to relay drivers 82 and 84, and to LED drivers 85, 86, 87 and 88. The LED drivers drive corresponding left and right spout indicator lights 105 and 106 and left and right tongue indicator lights 107 and 108, which are preferably located on an operator observable panel. Relay drivers 82 and 84 drive relays 90 and 92, respectively, in response to control signals generated at micro outputs P10 and P11 to operate respective pilot valves 36 and 34 of circuit 24. Diodes D1 and D2 provide for energization of relay 94 and pilot valve 44 whenever either of relays 90 and 92 is energized. Diode D3 provides a path for inductive fly-back current from relay 94. Although not shown, it can be assumed that drivers 82 and 84 include similar fly-back diodes.

The anodes of diodes D1 and D2 are respectively connected to relay sensing inputs P04 and P05 of the micro 80 via identical voltage limiting and filtering circuits 96 and 98. Circuit 98 is shown in detail and includes resistors R1, R2 and R3, a zener diode D4 (such as an IN4735) and capacitor C1 connected as shown. Through circuits 96 and 98, the micro 80 senses energization of lines 66 and 68, either manually due to operation of switch 51 or automatically due to signals generated at micro outputs P10 and P11. The circuits 96 and 98 protect the micro 80 from high voltages and transients.

Jumper circuits 100 and 102 and a switch 104 may be coupled to the micro 80 so that by opening or shorting various ones of the jumpers, the operation of the circuit 64 can be adapted for specific situations. For example, a spout sweep mode of operation may be enabled or disabled by opening or closing, respectively, switch 104.

The control algorithm will now be described with reference to the flow chart shown in FIGS. 4a–4p, 5, 7 and 8. The algorithm begins at step 202 in response to a hardware reset or upon an external or timer interrupt. At steps 204–208, the external interrupt and the timer interrupt are disabled and the random access memory (RAM) is cleared. In step 210, a hardware timer (not shown) which is integral to the micro 80, is initialized. This hardware timer periodically generates a flag signal (every 80 milliseconds, for example) which is used to obtain a desired time interval for use with the software timers described later.

In step 212, a turn delay software timer and a sweep mode delay software timer are started. Then, in step 214, the spout position or angle is read from sensor 60. In step 216, left and right "undershoot" registers are initialized to values representing 3 degrees, which is initially assumed to be the amount of spout over-travel.

The main loop begins with a manual operation test routine 217. This manual operation test routine (which is described in detail with reference to FIG. 8) sets or clears a manual flag, depending upon whether or not any signals at relay sense inputs P04 or P05 are due to manual operation of switch module 50.

After the manual test routine, the algorithm proceeds to step 218 which directs the algorithm to step 268 if the hardware timer flag is not set, otherwise, the algorithm proceeds to steps 220–226 where the turn delay timer and the sweep mode delay timer are decremented unless they are already decremented to zero.

The turn delay timer (timer 1) is used to maintain the spout at a target position closely aligned with the center of the wagon and to prevent operation of the sweep mode until 15 seconds expire after the forage harvester completes a turning operation (see steps 378, 384, 386 and 406). This assures that the wagon will be closely aligned with respect to the fore and aft axis of the forage harvester before the spout is allowed to be misaligned by a larger angle from the center of the wagon.

The sweep delay timer (timer 2) is used to maintain the spout at each sweep mode position for 15 seconds (see steps 508, 516, 528) and to prevent operation of the sweep mode until 15 seconds after completion of a manual or automatic spout movement (see step 482) which places the spout in the central 25% of the crop-receiving window.

In steps 228–232, a display timer (timer 3) is decremented (230) or reinitialized (232), as directed by step 228, in order to provide a data bit which toggles at a 1–2 Hz rate for use in triggering a flashing display device (not shown). Steps 234–236 decrement a relay delay timer (timer 4) for use in relay diagnostics.

Step 237 determines whether a spout pot error flag has been set, as in step 312. If not, the algorithm proceeds to step 238. However, if yes, then the algorithm is directed to step 237A which decrements a 4 second timer (timer 5), or "spout pot error delayed timer", which is started in step 312. Then, step 237B directs the algorithm to 238 if the timer 5 has not expired, otherwise, the algorithm proceeds to step 237C which sets a "spout pot error delayed flag". Thus, the "spout pot error delayed flag" is not set unless a spout pot error flag (set in step 312) is continuously set for 4 seconds.

Step 238 directs the algorithm to step 240 if an undershoot delay timer (timer 6) is running. Otherwise, the algorithm is directed to step 246. The timer 6 preferably has a duration of approximately 1 second and is started when the spout is instructed to stop moving (see step 508). The undershoot delay timer is used to delay recalculation of the right and left undershoot values, UNDR and UNDL, in step 504 until the spout has had enough time to coast to a stop following an automatic spout movement. Step 240 decrements the undershoot delay timer, whereupon in step 246, the hardware timer is reinitialized. After step 246, the manual operation test routine of FIG. 8 is repeated at step 268.

Step 270 clears a multiplexer error flag. Then, steps 272-278 operate to set a multiplexer error flag in step 278 if input pin 4 of multiplexer 72 is not properly grounded, if the voltage on input pin 12 of multiplexer 72 and at the threshold input, Vth, of micro 80, is not 2 volts, or if the voltage at pin 13 of multiplexer 72 is not 5 volts. Otherwise, the algorithm proceeds to step 286. The grounded input (pin 4) of multiplexer 72 and the 5-volt input (pin 13 of multiplexer 72) are chosen such that the address code of one is "all ones" and the address code of the other is "all zeroes". Thus, the address codes corresponding to ground and 5-volts will be incorrect if the addressing mechanism is not working correctly. In this manner, certain self-diagnostic functions are performed. First, the operation of the analog-to-digital converter (part of micro 80) is verified. Second, the operation of the addressing mechanism between micro 80 and multiplexer 72 is tested.

In steps 286 through 292, values are read from the spout calibration potentiometer 74, tongue calibration potentiometer 76, wagon width potentiometer 78 and the tongue position sensor 62. Then, step 294 directs the algorithm to step 302 where a tongue pot error value is set, and then to 303, if the tongue position value, TPTONG, from 292 corresponds to a value which is outside of the 334 degree electrical range of the tongue pot 62. Since the tongue is normally physically prevented from moving to positions beyond 90 degrees of straight back, very low or full scale tongue pot values can be interpreted as being due to a failure of the tongue potentiometer. Otherwise, step 294 directs the algorithm to step 296 where the tongue pot error is cleared. Then, at 298, the tongue position value, TPTONG, (from step 292) is modified by the tongue calibration value according to the statement TPTONG=TPTONG+(TCAL÷8), where TCAL is the tongue calibration value from calibration pot 76. At step 300, if the TPTONG value is greater than +55 degrees or less than −55 degrees, the TPTONG value is set equal to +55 degrees or −55 degrees, respectively. This prevents excessive spout rotation when the tongue is freely swinging or stowed.

Figure 8:
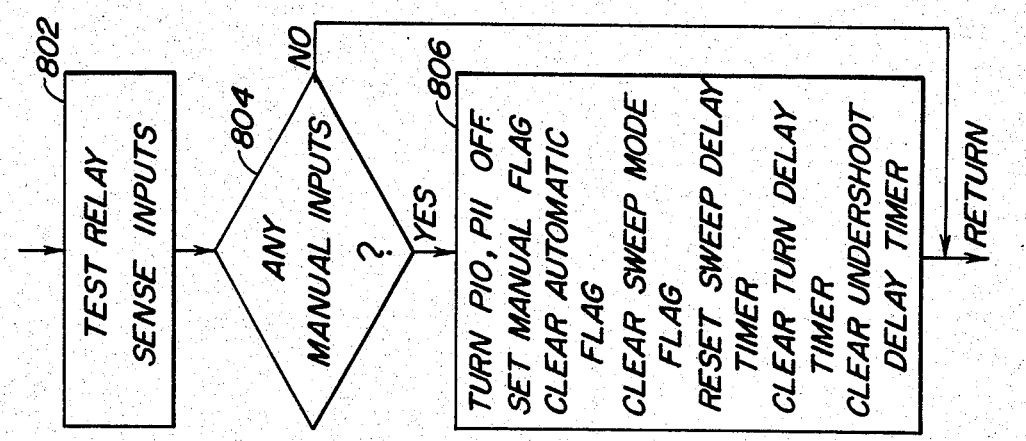
FIG. 8 is a logic flow diagram of a manual operation test routine executed during operation of the algorithm of FIGS. 4a–4p.

The manual operation test routine of FIG. 8 is repeated at step 303. At step 304, a spout angle or position valve, TSPOU, is obtained from spout angle sensor 60. Then, step 306 directs the algorithm to step 338 if the difference between the current and previous signals representing the spout angle is greater than a threshold value which would correspond to a spout angular velocity of, for example, 18 degrees per second. Since the spout normally moves slower than this angular velocity, rapidly changing spout pot values are an indication that the spout has rotated out of the electrically operative or "working" range of the spout pot 60. Thus, step 306 detects when the spout rotates past the electrically operative range of potentiometer 60, which would cause an abrupt change in the signal produced by spout pot 60. In this case, the old spout position value is utilized since the algorithm proceeds directly from step 306 to step 338, thus skipping step 334, where the spout position value would normally be readjusted. Otherwise, the algorithm proceds to step 308 which directs the algorithm to step 314 if a spout pot error flag has previously been set by step 312. If not, the algorithm proceeds from step 308 to 310. Step 310 directs the algorithm to step 320 if the signal from spout pot 60 is within its 334 degree "working" range. Otherwise, the algorithm proceeds to step 312. Thus, step 312 sets a spout pot error flag and starts the spout pot error delay timer running if the signal from spout pot 60 is outside the 334 degree "working" range. After step 312, the algorithm proceeds to step 328.

Step 320 directs the algorithm to step 328 if a wrap error flag has been set (by step 324). Otherwise, the algorithm proceeds to step 322 where a PREHEM value is stored to indicate whether the spout pot 60 was last in the high half of its resistance range or in the low half of its resistance range. After 322, the algorithm proceeds to step 328.

If step 308 directs the algorithm to step 314, then step 314 determines if the sensed spout pot 60 is within the 334 degree "working" range. If not, the algorithm proceeds to step 328. If so, it means that the spout pot 60 has returned to a position within the 334 degree working range, and the algorithm proceeds to step 316 which determines whether the signal from spout pot 60 corresponds to a spout pot position within the same hemisphere which it was previously within. If not, it is indicated that the spout has continued rotating out of one hemisphere of the working range of the spout pot 60 and then back into the other hemisphere without passing through the spout centered position, and then a wrap error flag is set in step 324. If yes, it means that the spout pot 60 has re-entered the working range in the same hemisphere in which it left the range by reversing its direction of rotation, whereupon the wrap error flag is cleared in step 318. After steps 324 or 318, the spout pot error and the spout pot error delayed flags are cleared in step 326. Thus, by keeping track of whether the spout is within its 344 degree working range and of which hemisphere spout pot 60 is in, the control system can determine when the operator has manually moved the spout 14 outside of its normal centered 140 degree working range and will return spout 14 toward the crop-receiving wagon in the proper direction.

Step 328 determines whether a wrap error or a spout pot eror flag has been set. If yes, it means that the spout pot 60 is either not within its working range or has wrapped around from one hemisphere to the other without going through the spout centered position and the algorithm proceeds to step 330. Step 330 determines if the spout was previously in the right hemisphere. If so, the spout 14 must now be beyond 70 degrees right of center and step 336 sets the actual spout position value, TSPOU, to a value corresponding to a spout position at the end of the electrical range of the spout pot 60 (spout 14 is 70 degrees right of center). If not, spout 14 must now be beyond 70 degrees left of center and step 332 sets the actual spout position value, TSPOU, to a value corresponding to a spout position at the end of the electrical range of the spout pot 60 (spout 14 is 70 degrees left of center). Thus, one of the spout position values set in steps 332 or 336 is used whenever the spout has "wrapped around", and a wrap error flag is set in step 328. However, if there is no wrap error, as is the case during normal operation, then step 328 directs the algorithm to step 334 where the actual spout position value, TSPOU, is adjusted according to the statement: TSPOU=TSPOU+(SCAL÷8), where SCAL is the spot calibration value from spout calibration potentiometer 74.

If step 306 detects that the signal spout pot 60 was changing faster than a certain rate due to rotating of the spout out of the electrical range of the spout pot 60 or due to an electrical failure of the spout pot 60, then the algorithm is directed directly to step 338, the spout position value is not updated or adjusted by steps 332, 334, or 336 and the rest of the algorithm operates with the previous spout position value.

It should be noted that during normal operation, (when the spout neither moves too fast nor wraps around, nor remains outside of the 140 degree working range), the algorithm will proceed through steps 306, 308, 310, 320, 322 and 328 to step 334, where the sensed spout position value, TSPOU, is recalculated.

After steps 332, 334 and 336, or from step 306, the algorithm proceeds to step 338 which determines whether the relay delay timer (described with reference to previous steps 234 and 236) is running. If yes, it means that not sufficient time has expired to allow signals to return to relay sensing inputs P04 and P05 of the micro 80, and the algorithm skips ahead to step 344. If not, then it means that relay status signals should have been received by micro inputs P04 and P05 and the algorithm is directed to step 340.

Steps 340-346 check the activation of relays 90 and 92 by comparing the signals at micro output command ports P10 and P11 with the signals at micro relay sense ports P04 and P05 and by generating or clearing a relay error flag according to the following rules.

A relay error flag is set in step 346 only when either port P10 or P11 is low and the corresponding port P04 or P05 is low; otherwise, the relay error flag is cleared in step 344. This provides an indication that a relay activation signal was generated, but that due to some failure, the corresponding relay was not energized. At the same time, a relay sense signal caused by a manual spout-moving operation is not interpreted as a failure.

The manual test routine of FIG. 8 is repeated at step 347.

Next, step 348 determines whether the multiplexer error flag was set in step 278 or the relay error flag was set in step 346. If yes, then the algorithm proceeds to steps 362-366 which operate over successive cycles of the routine to alternately flash the spout and tongue indicator lights 105-108. The lights 105-108 are flashed in response to the changing of a bit which is controlled by timer 3 (see steps 228-232). After steps 364 or 366, the algorithm proceeds to step 374. If no relay or multiplexer error flags have been set, then step 348 directs the algorithm to step 350.

Step 350 determines if a spout pot error flag has been set by step 312. If so, then both the left and right spout lights 105 and 106 are turned on by step 354 to indicate this condition to the operator. If not, then step 352 turns on one of the left or right spout lights if the spout 14 is left or right, respectively, of its centered position. Step 352 will turn both spout lights off if the spout is centered.

Step 356 determines whether a tongue pot error flag has been set by previous step 302. If so, then both tongue lights 107 and 108 are turned on by step 360 to indicate this condition to the operator. If not, then step 358 turns on either the left or the right tongue light if the tongue 16 is left or right, respectively, of its centered position. Step 358 will turn both tongue lights off if the tongue is centered.

In step 374, a "WORK" or "scratchpad" value is set equal to the absolute value of the angle of the tongue 16 with respect to its centered position. Then, step 376 compares the WORK value to a wide tongue angle threshold value, WIDE, of 12 degrees, for example. If WORK is greater than WIDE, then it means that the forage harvester and wagon are in a turn and the algorithm is directed to step 384 which starts the turn delay timer (timer 1). The turn delay timer is used to measure a predetermined time period and is repeatedly started by step 384 as long as the vehicles remain in the turn so that the turn delay timer will not expire until a predetermined time after the vehicles have come out of the turn. If WORK is not greater than WIDE, then it means that the vehicles are not in a turn and the algorithm proceeds to step 378. If the turn delay timer is still running, then step 378 directs the algorithm to step 386 which sets the hysteresis flag. Thus, the hysteresis flag is set in step 386 so that step 406 will cause a skip ahead to step 414 and will maintain the spout in the more closely tongue aligned position until a predetermined time after the vehicles have come out of a turn.

If the turn delay timer is not running, then step 378 directs the algorithm to step 380, which determines whether the WORK value is greater than a narrow tongue angle threshold value, NARROW, such as 9 degrees. If yes, it means that the vehicles are still in a turn and the algorithm skips ahead to step 387. If not, it means that the vehicles have come out of a turn and the hysteresis flag is cleared and a power-up (PWRUP) flag is set at step 382 for use in later described step 496.

In step 387, the manual operation test routine FIG. 8 is repeated.

In step 388, a desired spout position value, SPOUTN, is calculated as a function of the sensed tongue position by the equation: SPOUTN=M1×TPTONG+B1, wherein M1=0.805, TPTONG is the tongue position value (from sensor 62) and B1=0. This SPOUTN value in 388 is continuously updated and stored in a first desired spout position value register (not shown). These "M" and "B" values, and the ones which follow, are only exemplary and would vary for different vehicles.

In step 390, the manual operation test routine of FIG. 8 is repeated.

Then, in step 400, the WORK value is again set equal to the magnitude of the distance between the actual tongue position, TPTONG, and the center tongue position.

Then, in step 402, a spout position limit value, DLIMIT, is calculated from the equation: DLIMIT=(M2×WORK)+B2, where M2=0.0 and B2=4.0. The DLMIT value is added to and subtracted from the desired spout position value in steps 418 and 420 to provide the upper and lower limit values of a narrow target range of permitted spout positions about the desired position.

Then, in step 404, a decreased manual range value, DFMO (for use if the spout is under manual control) is calculated from the equation: DFMO=(M4×WORK)+B4, where M4=0.083 and B4 =19.

Then, step 406 determines whether the hysteresis flag was set (as in step 386) to indicate that the vehicles are turning. If so, the algorithm is directed to step 414. If not, the algorithm proceeds to step 408 where a maximum wide range value, ALIMIT is calculated by the equation: ALIMIT=M3×WORK+B3, where M3=0.083 and B3=22 are factors related to the geometry of the machine system.

Next, in step 410, the maximum wide range value, ALIMIT, is scaled as a function of the wagon window size, as represented by the setting of wagon width potentiometer 78, according to the equation: ALIMIT=(TPWDT×ALIMIT)−256, where TPWDT is a value representing the wagon width provided by wagon width potentiometer 78. TPWDT has a range of 0 to 255 so that ALIMIT is scaled by between 0 and 1. Thus, all values derived from the ALIMIT value in step 410 can be modified or scaled by adjusting the wagon width potentiometer 78.

Then, step 412 sets the DLIMIT value equal to the larger of the spout position limit value, DLIMIT, and of the maximum wide range value, ALIMIT.

Then, steps 414 and 416 cause the DLIMIT value to be decreased by the DFMO value if the spout is under manual control. Otherwise, the algorithm proceeds from step 414 to 418. This DLIMIT value from step 402, 412 or 416 is then added to and subtracted from the desired or nominal spout position value, SPOUTN, to provide high and low spout position range end point values, LIMHI and LIMLO, in steps 418 and 420, respectively. These LIMHI and LIMLO values represent the edges of a wagon-defined, crop-receiving, spout-position range. Thus, steps 388–420 establish a target range of spout positions centered about a nominal or desired position. The width of this target range depends upon the wagon width, upon whether the spout is under automatic or manual control, and upon whether the vehicle is turning or has recently completed a turn.

Thus, when the forage harvester is not in a turn, no automatic spout position correction is made until the spout position deviates from the tongue by at least +22 degrees. This +22 degree range is represented by the LIMHI and LIMLO values in steps 418 and 420, using the wide range ALIMIT value set in steps 408 and 410, unmodified by step 416. This 22 degree value results from the B3=22 value in step 408. The spout is then repositioned to a desired position represented by the TARGET value in step 428 or 430, due to operation of steps 490–514.

However, when the forage harvester is in a turn, a spout position correction will be made when the spout position deviates from the tongue by only 4 degrees. This narrower 4 degree range is represented by the LIMHI and LIMLO values in steps 418 and 420 using the DLIMIT value from step 402, *without* modification in steps 408–412. The 4 degree value results from the B2=4 value in step 402. This is because step 406 causes steps 408–412 to be bypassed when the forage harvester is in a turn.

Similarly, after the spout is manually moved, no automatic spout position correction will be made unless the spout position deviates from the tongue by 19 degrees. This is because the LIMHI and LIMLO values in step 418 and 420 will be derived using the modified ALIMIT value of step 416 when under manual control. The 19 degree value results from the B4=19 value in step 404. Furthermore, because of steps 440–482, the spout will be repositioned only to just within this +19 degree range, rather than to the closely tongue-aligned TARGET position. This permits the operator to manually position the spout to one side or the other without having the spout automatically repositioned back to the closely tongue-aligned position represented by the TARGET value. This is useful during windy or side-hill conditions.

Step 422 then determines whether the sweep mode flag is set to indicate that the spout position sweep mode (wherein the spout is automatically and sequentially moved through a series of positions) is active. If not, the algorithm proceeds to step 424. If yes, the algorithm proceeds to a routine represented by step 423 and shown in detail in FIG. 5, wherein the desired spout position value, SPOUTN, is redetermined to correspond to the next sweep mode position.

Figures 5, 6:
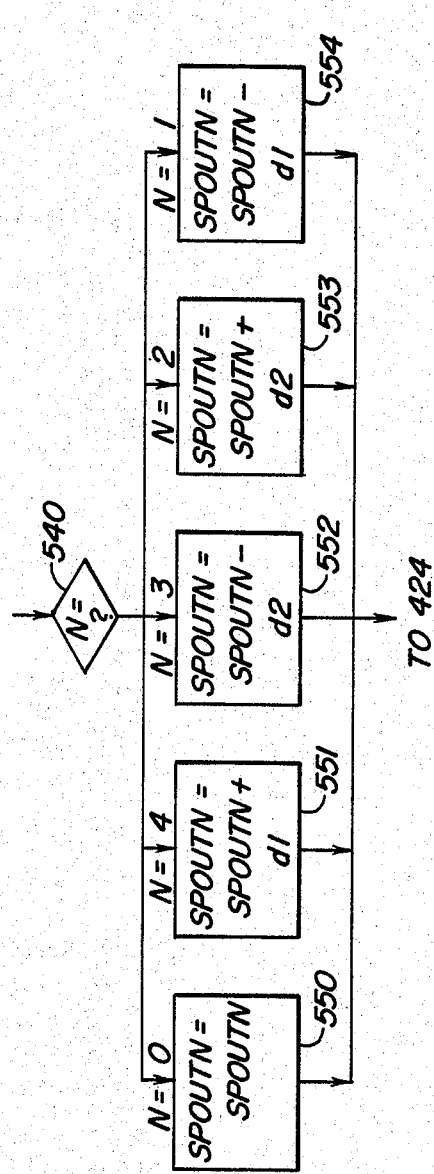
FIG. 5 is a logic flow diagram of a routine executed during operation of the algorithm of FIGS. 4a–4p.
FIG. 6 is a schematic representation of the sweep mode positions of the spout.

Referring now to FIG. 5, first the contents, N, of a modulo five software sweep step counter (which is decremented in step 504 of the main algorithm) is examined in step 540. Then, depending upon the sweep step counter value, N, the next desired spout position value, SPOUTN, is established in the corresponding one of steps 550–554. For example, if N=0, then the algorithm proceeds to step 424 using the previously established SPOUTN value. If N=1, 2, 3, or 4, then differential values d1 or d2 are added or subtracted to obtain the new desired SPOUTN value. The differential values d1 and d2 are defined as follows:

d1=(DLIMIT−DFMO)×$\frac{3}{4}$
d2=(DLIMIT−DFMO)×$\frac{3}{8}$.

In this manner, in the sweep mode, the SPOUTN value will assume one of five different values, one representing a spout position substantially centered with respect to the wagon tongue and the others representing a pair of spaced-apart positions arranged on either side of the centered position. The d1 and d2 values are chosen so that the spout sweep mode positions will typically be spaced approximately 7 and 15 degrees on either side of the spout centered position. It should be noted that this exemplary spacing will be varied in response to adjustment of the wagon width potentiometer 78 due to the operation of steps 410 and 412. Note also that as the sweep mode counter value N is decremented, the spout positions will alternate from the left and right sides of its centered position, as illustrated in FIG. 6.

Figure 41:
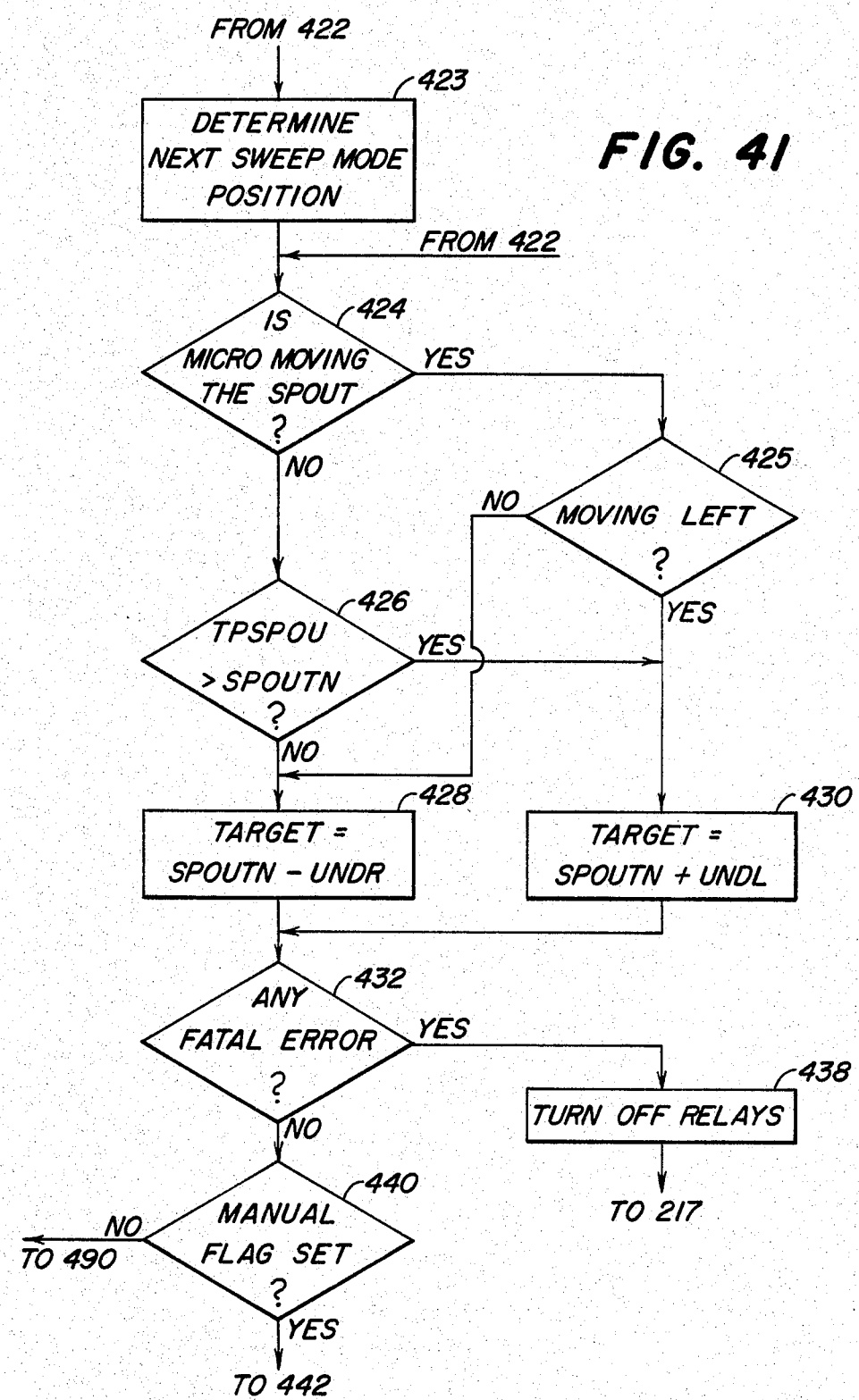

Returning now to FIG. 41, step 424 determines whether the spout is being moved automatically by the micro 80. If yes, the algorithm proceeds to step 425 which directs the algorithm to 430 if the spout is moving to the left, otherwise, to step 428. If the answer in 424 is no, then the algorithm is directed to step 426.

In step 426, a current sensed or actual spout position value, TSPOU, which is derived from the spout position potentiometer 60, is compared to the desired spout position value, SPOUTN. If TPSPOU is greater than SPOUTN, then step 426 directs the algorithm to step 430, otherwise, to step 428. Thus, depending upon whether the spout 14 is approaching its desired position from the right or from the left, a TARGET value is calculated in step 428 or 430, respectively, wherein right and left undershoot values, UNDR and UNDL, (equal to one-fourth of the values determined in step 504) is subtracted from or added to the SPOUTN value, respectively. Thus, the SPOUTN value is modified by an undershoot factor which is chosen so that if the spout moving relays 90 or 92 are turned off when the spout 14 reaches the position represented by the TARGET value, then the inertia of the spout 14 will carry it just to the desired spout position represented by the SPOUTN value.

Step 432 determines whether any "fatal" error flags have been set in steps 302, 237C or 278. If yes, then the algorithm proceeds to step 438, otherwise the algorithm is directed to step 440. Step 438 turns off the relays 90-94 and returns the algorithm to the "main loop start" at step 217.

At this point, it is appropriate to summarize the operation of this system with respect to spout pot and wrap-around errors. When the spout moves out of electrical range of the spout pot 60, both spout lights are turned on in step 354 due to the operation of steps 310, 312 and 350. If the spout pot error flag (set in 312) is not cleared before expiration of the spout pot error delay timer (started in step 312), then all relays are turned off due to the operation of steps 237C, 432 and 438. However, under the normal manually-induced wrap-around situation, the spout pot error flag will be cleared in step 326 before the spout pot error delay timer can expire, and step 432 will prevent step 438 from forcing the relays off. Note that the display is immediately controlled by the spout pot error flag. However, the relays are controlled by steps 432 and 438 in response to the spout pot error delayed flag.

Step 440 determines if a manual flag was set by any of the manual test routines in response to a manual activation of switch 51. If not, the algorithm proceeds to steps 490-514 which define an automatic operational strategy, otherwise the algorithm proceeds to steps 442-486 which define a manual operational strategy.

Figure 4M:
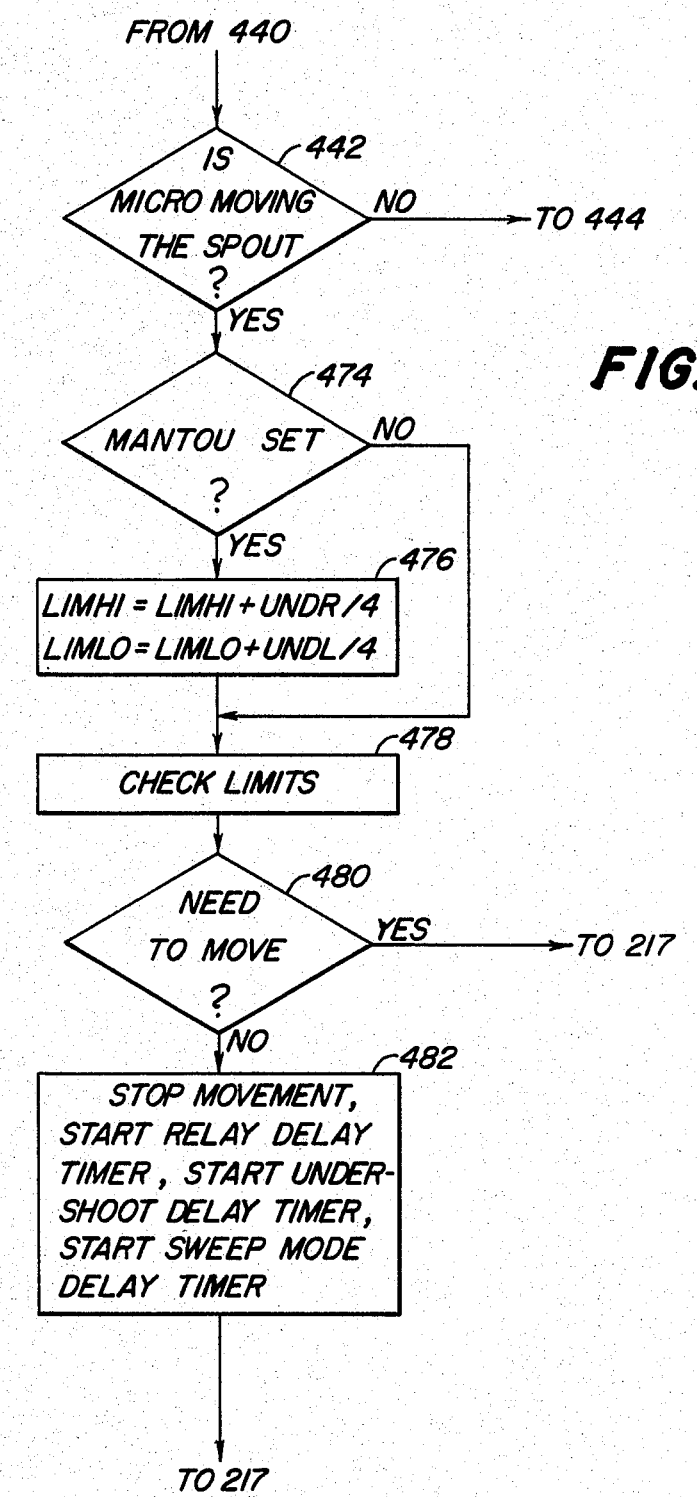
Figure 4N:
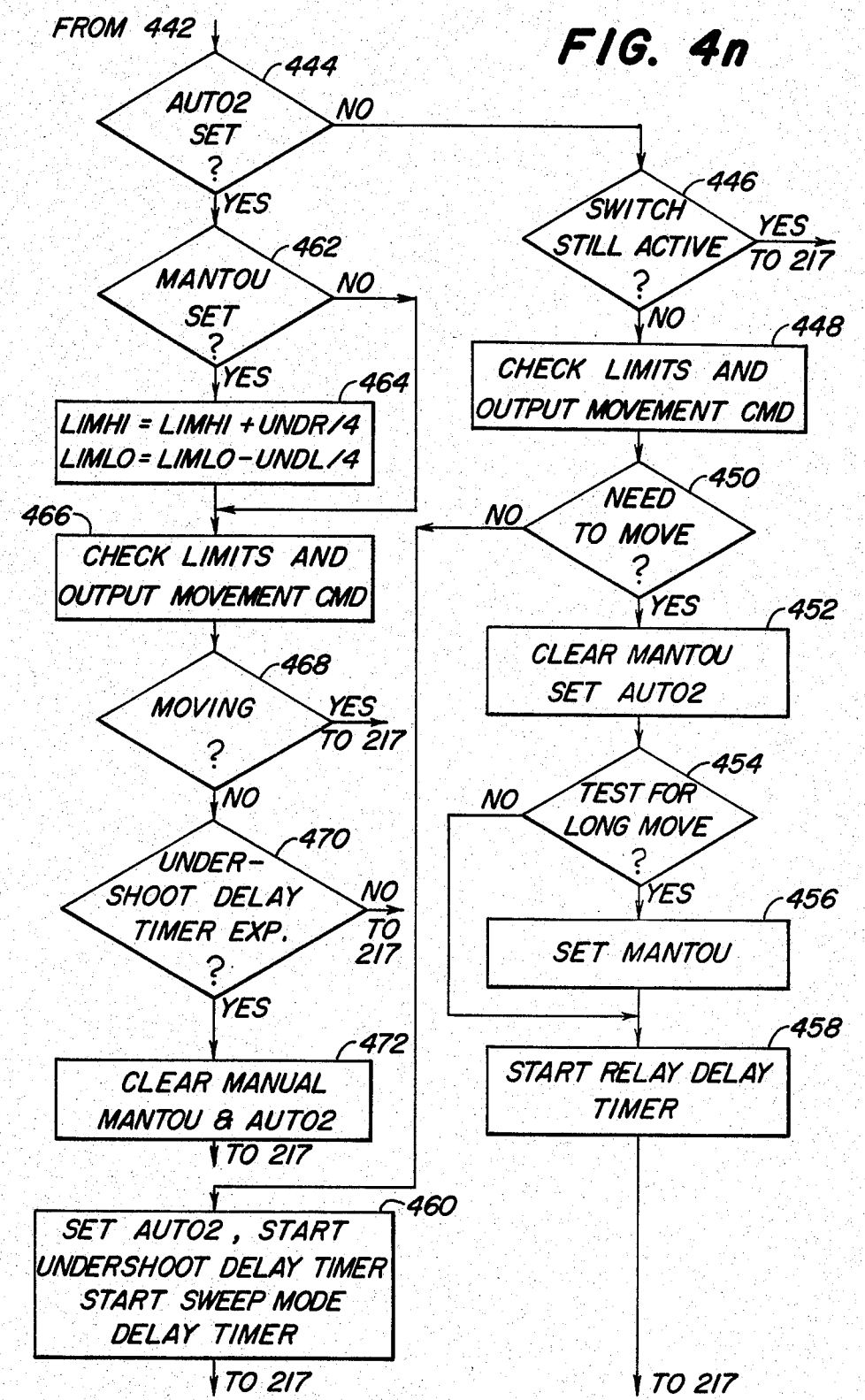
Figure 40:
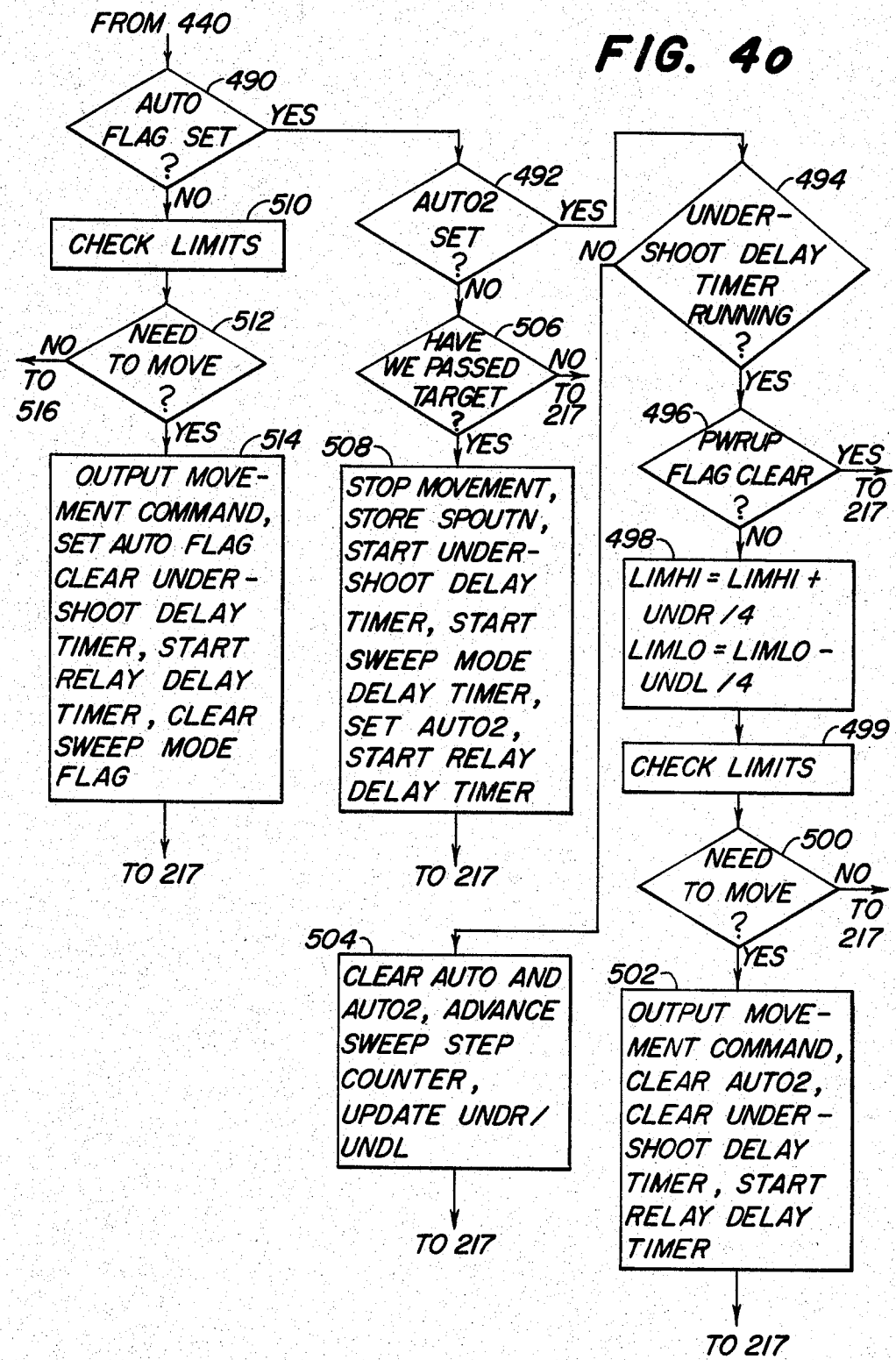

In the manual strategy algorithm portion, step 442 determines whether the spout is moving in response to manual actuation of switch 51 or whether the spout is moving in response to command signals generated at outputs P10 and P11 of micro 80. If micro outputs P10 and P11 are not causing the spout movement, then the algorithm is directed to step 444 (FIG. 4n) which determines whether an "AUT02" flag has been set, as by step 460 immediately following termination of manual activation of switch 51. If the "AUT02" flag is not set, the algorithm proceeds to step 446 which determines whether switch 51 is still engaged (as indicated by the presence of a relay sense signal at relay sense input P04 or P05). If yes, step 446 directs the algorithm back to the main loop start at 217 so that the manual movement of the spout via switch 51 may continue. If no, then it means that the operator has ended actuation of switch 51 and step 446 directs the algorithm to a "check limit" represented by 448 and which will be described later with reference to FIG. 7. Briefly, this routine generates a "stop" command if the spout is positioned within a wagon crop-receiving range of positions. Routine 448 will also generate "move left" or "move right" commands, depending upon which way the spout must be moved to return to this crop-receiving range. If the spout is outside the crop-receiving range, then the command will be "move left" or "move right", and step 450 will direct the algorithm to step 452 which clears a "MANTOU" flag and sets the "AUT02" flag. However, if the command generated by the routine of 448 is "stop", it means that the spout was manually moved, but not out of the crop-receiving range, and the algorithm is directed by step 450 to step 460. Step 460 sets the "AUT02" flag, starts the undershoot delay timer and starts the sweep mode delay timer.

After step 452, then step 454 determines whether the spout is out of the crop-receiving range by more than a certain distance. This certain distance is preferably defined as a distance represented by the sum of the distances represented by the LIMHI or LIMLO values and the undershoot values, UNDR or UNDL. If the spout position is out of the crop-receiving range by more than this certain distance, then this is defined as a "long move" situation and step 454 directs the algorithm to step 456 where this situation is indicated by the setting of the "MANTOU" flag. Otherwise, the algorithm proceeds directly to step 458 which starts the relay delay timer, after which the algorithm returns to step 217. The relay delay timer is started so that step 338 will prevent checking of the relays (by step 340) during future executions of the algorithm while the spout is starting to move.

Returning to step 444, if the AUTO 2 flag was set (as will be done by step 460 upon termination of a manual activation of switch 51), then the algorithm is directed to step 462. Step 462 determines whether the MANTOU flag was set, (indicating a "long move" situation). If yes, the algorithm proceeds to step 464 where the limit values LIMHI and LIMLO are adjusted by their corresponding undershoot values. Otherwise, the algorithm proceeds directly to step 466 which again performs the routine referred to by previously described step 448 and described in detail with respect to FIG. 7. After the appropriate spout movement commands are generated at step 466, then step 468 determines whether the spout is moving. If yes, the algorithm returns to step 217 while the spout movement continues. Once the spout has stopped moving, after termination of manual activation of switch 51, the algorithm proceeds to step 470 which determines if the undershoot delay timer (started in step 460) has expired. If not, the algorithm returns to step 217. In this manner, the undershoot delay timer prevents updating of the undershoot values until 1 second after termination of an automatic spout movement, and delays re-examination of the spout position by the automatic operating strategy until the spout has had time to come to rest after a manual movement. This allows for the spout to be automatically brought back into the crop-receiving "window" when the manual switch is released when the spout is just within the "window", but the spout inertia carries it out of the "window". If yes, the algorithm proceeds to step 472 which clears the MANUAL, MANTOU and AUT02 flags to indicate the termination of a manual spout movement and the absence of a "long move" situation. After 472, the algorithm returns to step 217.

Returning now to step 442 (FIG. 4m), if the micro is moving the spout (such as when the spout is automatically moved back into the crop-receiving range after a manual movement of the spout out of that range), then step 442 directs the algorithm to step 474 which determines whether the MANTOU flag is set. If yes, it means that a "long move" situation exists and the algorithm proceeds to step 476 where the LIMHI and LIMLO values are adjusted by the undershoot values. Otherwise, step 474 directs the algorithm directly to step 478. Step 478 is identical to the routine illustrated in FIG. 7 except that step 710 (output commands) of this routine is eliminated from the routine performed at step 478. Then, step 480 performs the same determination which was previously described with respect to step 450 so that if "move right" or "move left" commands result from step 478, then the algorithm is returned to step 217. Otherwise, the algorithm proceeds to step 482 where a stop movement command is generated, the relay delay timer is started to prevent the erroneous detection of manual operation in step 802, the undershoot delay timer is started to prevent the initiation of an automatic spout movement until the spout has stopped coasting, and the sweep mode delay timer is started (to prevent sweep mode operation until a certain time after termination of a manual spout movement). After step 482, the algorithm returns to step 217.

This manual control portion of the algorithm assures that the spout remains in or will be returned to the wagon crop-receiving range of positions after termination of manual spout movement via switch 51.

Figure 4P:
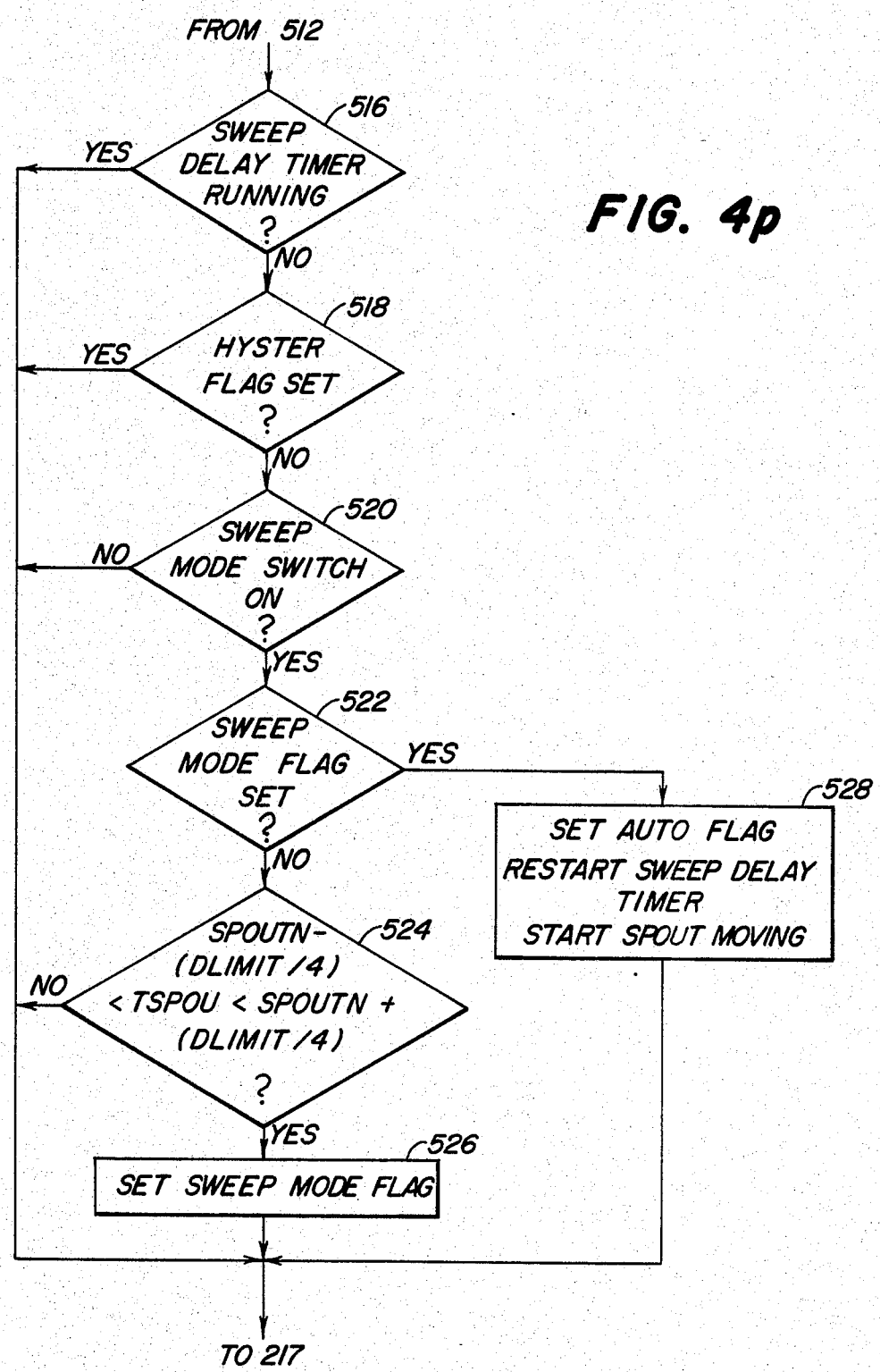
Figure 7:
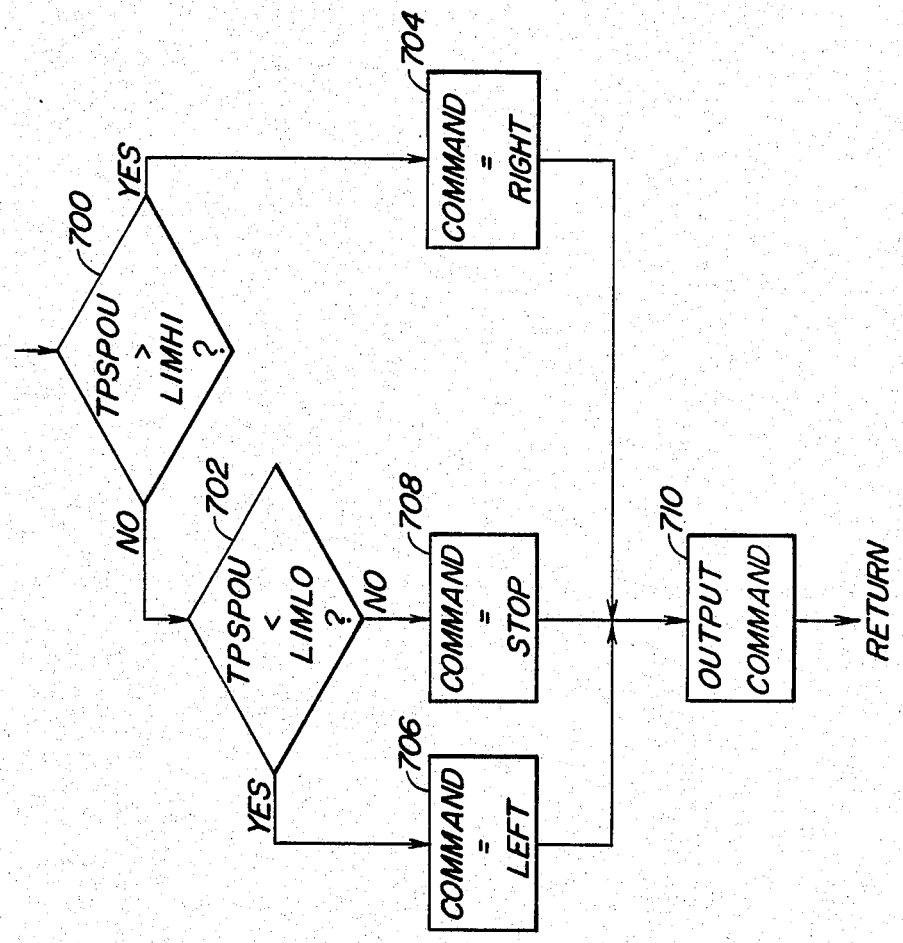
FIG. 7 is a logic flow diagram of a check limit and output command routine executed during operation of the algorithm of FIGS. 4a–4p.

Returning now to step 440 (FIG. 41), if the manual flag was not set, then the algorithm is directed to the automatic operating strategy portion of the algorithm of steps 490-514 (FIGS. 4o and 4p). Step 490 directs the algorithm to step 492 if the AUTO flag is set. Step 492 determines whether the AUT02 flag has been set (as in step 508). If yes, the algorithm proceeds to 494, otherwise to 506. Step 494 determines whether the undershoot delay timer is running. If yes, the algorithm is directed to step 496 which determines whether the PWRUP flag is cleared. Since the PWRUP flag is initially cleared upon start-up and is not set in step 382 until the turn delay timer has expired, step 496 will prevent automatic spout movement upon start-up until the undershoot delay time has expired (494) and the undershoot values are updated at step 504. If the PWRUP flag has been set (as at step 382), then the algorithm proceeds to step 498 where the LIMHI and LIMLO values are modified by the undershoot values UNDR and UNDL. Then, in step 499, the check limit routine consisting of steps 700-708 of FIG. 7 is executed. Then, in step 500, if a "stop movement" command is generated in step 499, step 500 returns the algorithm to step 217. If a "move right" or "move left" command is generated, then the algorithm proceeds to step 502. Step 502 outputs the generated move command to the micro output P10 or P11 so that the desired automatic spout movement is performed. Step 502 also clears the AUT02 flag, clears the undershoot delay timer (so that a new undershoot value will not be calculated until the spout stops moving) and starts the relay delay timer (to prevent checking of relay sense inputs P04 and P05 until a short time after spout movement has started. After 502, the algorithm returns to step 217.

Now, returning to step 494, if the undershoot delay timer has expired, then the algorithm is directed to step 504 where the AUTO and AUT02 flags are cleared, the sweep step counter value is advanced and the undershoot values UNDR and UNDL are updated as follows: UNDR=UNDR+(SPOUTN-TPSPOU) and UNDL=UNDL+(TPSPOU-SPOUTN), where the SPOUTN values are the values stored by step 508 in a second desired spout position register. These undershoot values, UNDR and UNDL, are used in previously described steps 428 and 430 to calculate the spout position targets.

Thus, the undershoot values are not updated in step 504 until step 494 has determined that the undershoot delay timer (1 sec.) has expired. After 504, the algorithm returns to 217.

Returning now to step 492, if the AUT02 flag has been cleared (as in steps 502 or 504), then step 492 will direct the algorithm to step 506 which determines whether the spout has gone past the target position represented by the TARGET values of steps 428 and 430. If no, the algorithm returns to step 217. If yes, the algorithm proceeds to step 508 which: (a) generates a "stop movement" command, (b) stores the current desired spout position value, SPOUTN, in a second register (separate from the first register which contains the SPOUTN value from step 388) for use in determining the undershoot values in step 504, (c) starts the undershoot delay timer, (d) starts the sweep mode delay timer, (e) sets the AUT02 flag, and (f) starts the relay delay timer. After 508, the algorithm returns to step 217.

Returning now to step 490, if the AUTO flag is not set (as when cleared in step 504), then step 490 directs the algorithm to step 510 which again executes steps 700-708 of the check limit routine of FIG. 7. If a "move right" or "move left" command is generated, then step 512 direct the algorithm to step 514. Step 514: (a) outputs the movement command to micro outputs P10 or P11, (b) sets the AUTO flag, (c) clears the undershoot delay timer, (d) starts the relay delay timer, and (e) clears the sweep mode flag. After step 514, the algorithm returns to step 217. If in step 512, the movement command was "stop", then step 512 directs the algorithm to steps 516 526 (FIG. 4p). Steps 516-526 determine whether the sweep delay timer is running, whether the hysteresis flag is set (to prevent sweep mode operation when in a turn), whether the sweep mode switch 104 is open, and whether the sweep mode flag is set (as in 526). If the result of any of the determinations of steps 516-520 is yes, then the algorithm is directed to step 217 and no spout movement is begun. However, if the results of 516-520 are all no, then the algorithm proceeds to 522 which directs the algorithm to 524 if the sweep mode flag is not set. Step 524 prevents the sweep mode flag from being set in step 526 unless the spout is positioned within the central 25% of its wagon crop-receiving range of positions. This prevents the spout from sweeping when the operator manually moves the spout to a position outside of this central 25% in order to fill a wagon while compensating for a side hill or for a cross wind. Once the condition of 524 is met, then the sweep mode flag will be set in 526 and the next time through, step 522 will direct the algorithm to step 528, which causes the spout to be moved toward its next sweep mode target position, as determined by steps 423, 428 and 430. Step 528 also restarts the sweep mode delay timer and sets the auto movement flag. After steps 526 and 528, the algorithm returns to step 217.

Referring now to FIG. 7, the check limit and command generating routine begins at step 700 which determines whether the sensed spout position value, TSPOU, is greater than the spout position range end point value, LIMHI. If yes, the routine proceeds to steps 704 and 710 which cause the generation and output of a "move right" command signal which will activate relay 90 and move the spout 14 to the right. If not, then the routine proceeds to step 702 which determines if the sensed spout-position value, TSPOU, is less than the spout position range end point value, LIMLO. If yes, the routine proceeds to steps 706 and 710 which cause the generation and output of a "move left" command signal which will activate relay 92 and move the spout 14 to the left. If not, then the routine is directed to steps 708 and 710 which cause the generation and output of "stop" command signals which turn both relays 90 and 92 off and thus stop movement of the spout 14.

In this manner, this routine generates command signals which will cause the spout 14 to move toward the wagon crop-receiving range of spout positions (represented by LIMHI and LIMLO) after the operator has completed a manual movement of the spout 14 outside of this range by use of a switch 51. Thus, when the forage harvester is going through a thistle patch, the operator may manually move the spout outside of the wagon crop-receiving range of positions by using switch 51. Then, when switch 51 is de-activated, the spout 14 will be returned to the edge of the crop-receiving range in response to the command signals generated by steps 448 or 466.

Referring now to FIG. 8, the manual test routine begins at 802 wherein the signals at micro relay sense inputs P04 and P05 are compared to the signals at control outputs P10 and P11 to determine if a signal is present at lines 66 or 68 without an actuation signal being present at the corresponding control output. If so, this is interpreted as a manual operation via switch module 50 and step 804 directs the routine to step 806. If not, it means that a manual operation has not been performed and step 804 directs the routine to return to the main algorithm. Note that if relay 90 or 92 was recently de-activated (as indicated by the relay delay timer still running), then the appropriate left or right signal which might be present is not treated as a manual input.

In step 806, the following operations are performed: the P10 and P11 control outputs are turned off to prevent automatic movement of the spout 14; a manual operation flag is set; an automatic flag and a sweep mode flag are cleared; the sweep delay timer is reset; the turn delay timer is cleared; and the undershoot delay timer is cleared. The routine then returns to the main algorithm so that the manual control of the spout can continue without interference.

The conversion of the above-described flow chart into a standard language for implementing the algorithm described by the flow chart in a digital data processor, such as a microprocessor, will be evident to those with ordinary skill in the art.

While the invention has been described in conjunction with a specific embodiment, it is to be understood that many alternatives, modifications, and variations will be apparent to those skilled in the art in light of the aforegoing description. For example, the control system described herein could be adapted to control the discharge spout on any agricultural machine with an attached collector vehicle or with a non-attached collector vehicle using a non-mechanical collector vehicle position sensor. Accordingly, this invention is intended to embrace all such alternatives, modifications, and variations which fall within the spirit and scope of the appended claims.

We claim:

1. In a forage harvester having a movable crop discharge spout for directing crop to a crop-receiving wagon and a spout aiming control system, the improvement wherein the control system comprises:
   a sweep mode which is operational to automatically move the spout through a plurality of sweep mode positions to achieve even filling of the wagon;
   a non-sweep mode which is operational to automatically maintain a predetermined spout-wagon angular relationship to prevent crop spillage and wherein the spout is moved in response to changes in an angular relationship between the forage harvester and the wagon; and
   mode selecting means for automatically making one or the other of said modes operational, depending upon sensed conditions.

2. The invention of claim 1, wherein the control system comprises:
   a sweep mode counter having a plurality of states corresponding to the plurality of sweep mode positions;
   means for sequentially selecting among the plurality of spout sweep mode positions, depending upon the status of the sweep mode counter;
   means for sequentially moving the spout to the selected spout sweep mode positions; and
   means for changing the state of the sweep mode counter after the spout is moved to each selected sweep mode position.

3. The invention of claim 2, further comprising:
   alignment means responsive to a predetermined spout-wagon relationship for automatically aligning the spout with respect to a tongue of the crop-receiving wagon; and
   means changing the state of the sweep mode counter after operation of the alignment means.

4. The invention of claim 1, fruther comprising:
   means for preventing operation of the sweep mode whenever the spout is positioned outside of a predetermined range of positions.

5. The invention of claim 4, wherein the predetermined range comprises a central portion of a wagon crop-receiving range of spout positions.

6. The invention of claim 1, further comprising:
   delay means for preventing operation of the sweep mode until a predetermined time after termination of operation of the non-sweep mode.

7. The invention of claim 1, further comprising:
   manually operable means for generating spout movement command signals, the control system including means for moving the spout in response to the command signals generated by the manually operable means;
   inhibit means for preventing operation of the sweep mode when the spout is manually moved outside of a predetermined range of positions; and
   inhibit means for preventing operation of the sweep mode unless a predetermined delay time expires following a movement of the spout in response to the command signals generated by the manually operable means.

8. The invention of claim 1, further comprising:
   manually operable means for generating spout movement command signals, the control system including means for moving the spout in response to the command signals generated by the manually operable means; and
   inhibit means for preventing operation of the sweep mode when the spout is moved outside of a predetermined range of positions in response to the command signals generated by the manually operable means.

9. The invention of claim 1, further comprising:
   manually operable means for generating spout movement command signals, the control system including means for moving the spout in response to the command signals generated by the manually operable means; and
   inhibit means for preventing operation of the sweep mode unless a predetermined delay time expires following a movement of the spout to a position within a predetermined range of positions in response to the command signals generated by the manually operable means.

10. The invention of claim 1, further comprising:

means for preventing automatic movement of the spout among the sweep mode positions when the forage harvester and wagon are executing a turn.

11. The invention of claim 1, further comprising:
means for preventing automatic movement of the spout among the sweep mode positions following execution of a turn by the forage harvester and wagon unless the wagon is substantially aligned with the fore-and-aft axis of the forage harvester for at least a predetermined delay time after completion of the turn.

12. The invention of claim 1, wherein the sweep mode positions are comprised of a first position substantially centered with respect to the wagon, and second, third, fourth and fifth positions, wherein the second and fifth positions are on opposite sides of the first position, the third position is between the first and fifth positions and the fourth position is between the first and second positions.

13. The invention of claim 12, wherein the sweep mode sequentially moves the spout from the first to the second, to the third, to the fourth and then to the fifth position.

14. In an agricultural machine having a movable crop discharge spout for directing crop to a crop-receiving wagon, a control unit for automatically generating spout movement command signals as a function of sensed parameters, operator-actuated means for manually generating spout movement command signals and means for moving the spout in response to the manually and automatically generated command signals, the improvement wherein the control unit comprises:
means for sensing manual movement of the spout positions outside of a wagon crop-receiving window and means for automatically returning the spout to an edge of the crop-receiving window after termination of a manual movement of the spout which leaves the spout aimed outside of the crop-receiving window.

15. The invention of claim 14 wherein the moving means comprises an electro-hydraulic valve energizable by the manually and automatically generated command signals; and
the manual movement sensing means comprises valve sensing means for sensing the energization of the valve and logic means for determining that a command signal has beem manually generated when the valve sensing means senses energization of the valve when no corresponding automatically generated command signal is generated.

16. In an agricultural machine having a movable crop discharge spout for directing crop to a crop-receiving wagon, a control unit for automatically generating spout movement command signals as a function of sensed parameters, operator-actuated means for manually generating spout movement command signals, means for moving the spout in response to the manually and automatically generated command signals including an electro-hydraulic valve means energizable by the manually and automatically generated command signals, the improvement wherein the control unit comprises:
sensing means for sensing the energization of the valve means;
logic means for determining that a command signal has been manually generated when the sensing means senses energization of a valve means when no corresponding automatically generated command signal has been generated, and
means for at least temporarily suppressing further automatic generation of command signals in response to manual generation of a command signal.

17. The invention of claim 16 wherein the control unit further comprises:
alignment means for automatically aiming the spout at a central portion of a wagon crop-receiving window and means responsive to a manually generated command signal for disabling the alingment means to permit the spout to be manually aimed outside of said central window portion.

18. The invention of claim 17, wherein the control unit further comprises:
means for automatically returning the spout to an edge of the crop-receiving window after termination of a manual movement of the spout which leaves the spout aimed outside of the crop-receiving window.

19. In an agricultural machine having a movable crop discharge spout for directing crop to a crop-receiving wagon and a control unit which automatically maintains the spout within a narrow position range when the machine is being steered through a turn, which permits the spout to move within a wide position range when the machine is not turning and which includes delay means for maintaining the spout within the narrow range for a certain time period after a turn is completed, the improvement wherein the control unit comprises:
means for distinguishing between manually and automatically produced movement of the spout and for overriding the delay means to permit manual positioning of the spout outside of the narrow range immediately upon termination of a turn of the machine.

20. In a forage harvester having a movable crop discharge spout for directing crop to a crop-receiving wagon, a spout-aiming system comprising:
sweep mode means for automatically and sequentially moving the spout to a plurality of discrete sweep mode positions and for maintaining the spout at each of said sweep mode positions for a predetermined time period;
alignment means responsive to a predetermined spout-wagon relationship for automatically aligning the spout with respect to the crop-receiving wagon; and
delay means for preventing operation of the sweep mode means until a predetermined rime after termination of operation of the alignment means.

21. In a forage harvester having a movable crop discharge spout for directing crop to a crop-receiving wagon, a spout-aiming system comprising:
sweep mode means for automatically and sequentially moving the spout to a plurality of discrete sweep mode positions and for maintaining the spout at each of said sweep mode positions for a predetermined time period;
manually operable means for generating spout movement command signals, the control system including means for moving the spout in response to the oommand signals generated by the manually operable means;
inhibit means for preventing operation of the sweep mode means when the spout is moved outside of a predetermined range of positions in response to the command signals generated by the manually operable means; and inhibit means for preventing operation of the sweep mode means unless a predetermined delay time expires following a movement of the spout in response to the command signals generated by the manually operable means.

22. In a forage harvester having a movable crop discharge spout for directing crop to a crop-receiving wagon, a spout-aiming system comprising:

sweep mode means for automatically and sequentially moving the spout to a plurality of discrete sweep mode positions and for maintaining the spout at each of said sweep mode positions for a predetermined time period;

manually operable means for generating spout movement command signals, the control system including means for moving the spout in response to the command signals generated by the manually operable means; and inhibit means for preventing operation of the sweep mode means when the spout is moved outside of a predetermined range of positions in response to the command signals generated by the manually operable means.

23. In a forage harvester having a movable crop discharge spout for directing crop to a crop-receiving wagon, a spout-aiming system comprising:

sweep mode means for automatically and sequentially moving the spout to a plurality of discrete sweep mode positions and for maintaining the spout at each of said sweep mode positions for a predetermined time period; and means for preventing automatic movement of the spout among the sweep mode positions when the forage harvester and wagon are executing a turn.

24. In a forage harvester having a movable crop discharge spout for directing crop to a crop-receiving wagon, a spout-aiming system comprising:

sweep mode means for automatically and sequentially moving the spout to a plurality of discrete sweep mode positions and for maintaining the spout at each of said sweep mode positions for a predetermined time period; and means for preventing automatic movement of the spout among the sweep mode positions following execution of a turn by the forage harvester and wagon unless the wagon is substantially aligned with the fore-and-aft axis of the forage harvester for at least a predetermined delay time after completion of the turn.

25. In a forage harvester having a movable crop discharge spout for directing crop to a crop-receiving wagon, a spout-aiming system comprising:

sweep mode means for automatically and sequentially moving the spout to a plurality of discrete sweep mode positions and for maintaining the spout at each of said sweep mode positions for a predetermined time period, the sweep mode positions being comprised of a first position substantially centered with respect to the wagon, and second, third, fourth and fifth positions, wherein the second and fifth positions are on opposite sides of the first position, the third position is between the first and fifth positions and the fourth position is between the first and second positions.

* * * * *

UNITED STATES PATENT AND TRADEMARK OFFICE
CERTIFICATE OF CORRECTION

PATENT NO. : 4,529,348
DATED : 16 July 1985
INVENTOR(S) : Stanley Jerome Johnson et al It is certified that error appears in the above-identified patent and that said Letters Patent is hereby corrected as shown below:

```
Column 18, line 19, delete "fruther" and insert
     -- further --.
Column 19, line 33, after "spout", insert -- to --.
Column 19, line 47, delete "beem" and insert -- been --.
Column 20, line 11, delete "alingment" and insert
     -- alignment --.
Column 20, line 49, delete "rime" and insert -- time --.
Column 20, line 62, delete "oommand" and insert
     -- command --.
```

Signed and Sealed this

Tenth Day of June 1986

[SEAL]

*Attest:*

DONALD J. QUIGG

*Attesting Officer*  *Commissioner of Patents and Trademarks*